(12) United States Patent
Cash et al.

(10) Patent No.: US 7,146,304 B1
(45) Date of Patent: Dec. 5, 2006

(54) METHOD AND APPARATUS FOR LANE AND FRONT-END PLANNING AND DESIGN ANALYSIS

(75) Inventors: Charles R. Cash, New Albany, OH (US); William Douglas Poynter, Duluth, GA (US)

(73) Assignee: NCR Corporation, Dayton, OH (US)

( * ) Notice: Subject to any disclaimer, the term of this patent is extended or adjusted under 35 U.S.C. 154(b) by 1187 days.

(21) Appl. No.: 09/653,196

(22) Filed: Aug. 31, 2000

Related U.S. Application Data

(60) Provisional application No. 60/151,629, filed on Aug. 31, 1999.

(51) Int. Cl.
*G06F 9/45* (2006.01)
*G06F 9/44* (2006.01)
*G06F 9/46* (2006.01)
*G06F 17/30* (2006.01)
*G06F 11/34* (2006.01)

(52) U.S. Cl. .................... 703/22; 703/8; 703/9; 703/10
(58) Field of Classification Search .............. 702/1–22; 705/10, 7, 9, 8; 703/6, 22; 235/383
See application file for complete search history.

(56) References Cited

U.S. PATENT DOCUMENTS

| | | | | |
|---|---|---|---|---|
| 5,390,107 | A | * | 2/1995 | Nelson et al. ................. 705/10 |
| 5,557,513 | A | * | 9/1996 | Frey et al. ...................... 705/8 |
| 5,978,772 | A | * | 11/1999 | Mold .......................... 705/16 |
| 6,629,081 | B1 | * | 9/2003 | Cornelius et al. ............. 705/30 |
| 2003/0177055 | A1 | * | 9/2003 | Zimmerman et al. ......... 705/10 |

OTHER PUBLICATIONS

Human Factors Engineering: Mangament Decision Modeling Serives. (2000). www.ncr.com.*

White-K.P Simulating a Nonstationary Poisson Process using Bivariate Thinning: the case of "typical weekday" arrivals at a consumer electronics store. Dept. of System Engineering. Univ. of Virginia Dec. 5-8, 1999.*

Gabriel et al. A simulation Approach to Balancing Annual Risk and Reward in Retail Elctrical Power Markets Univ. of Maryland Nov. 2002.*

Fong-S et al. Modeling Personnel and Roles for Electronic Commerce Retail. Proceedings of Computer Personnel Research 2000 Conference, Chicago, IL. Apr. 6-8, 2000.*

Madigan-E.F. et al. "Simulation Success Stories: Business Processing Reengineering" 1997 Winter Simulation Conference. p. 1275-1279 (pertinent pp. 1276-1277).*

(Continued)

*Primary Examiner*—Paul Rodriguez
*Assistant Examiner*—Thomas H. Stevens
(74) *Attorney, Agent, or Firm*—Lowe Hauptman Gilman & Berner, LLP; Paul W. Martin

(57) ABSTRACT

The Lane and Front-end Effectiveness Model (LFEM) is a self-contained PC desktop application that allows an analyst to quantitatively predict the impact of changes to their checkout operations. This application, according to the present invention, includes four simulation models representing the complex interactions between customers, staff, and checkstand resources. Three of these models are detailed lane models and the fourth is a store front-end checkout model. An analyst can use the LFEM to evaluate, in detail, different checkstand configurations and transaction processes and the effect these changes have on overall front-end performance. The purpose of this application is to provide retailers with timely information to reduce the risk and uncertainties of investing in new technologies or design changes by predicting their impact and return before committing resources to their acquisition or implementation.

32 Claims, 33 Drawing Sheets

OTHER PUBLICATIONS

Human Factors Engineering "Lane and Front-End Effectiveness Model" Feb. 1999. figuers 4-33.*

Hogg et al., "Gerts Qr: A Model for Multi-Resource Constrained Queueing System. I. Concepts, Notation and Examples". 1975 Univ of Illinois Urbana-Champaign. p. 89-99.*

* cited by examiner

FIG. 9

Edit Parameter File

Model Name: Lane Model 2 (Nelson)
Scenario Name: Default

Parameter Categories

- Transaction Pre-Itemization — 922
- Transaction Itemization — 924
- Transaction Finalization — 926
- Bagging — 928
- Configuration — 930
- Customer Demand — 932
- Model Parameters — 934
- Intervention — 936

| Lane # | Parameter | Value | Range | Description |
|---|---|---|---|---|
| 1 | Time length of scenario | 60 | 0.0 to 1440.0 (minutes) | Length of the simulation sceneraio in minutes |
| 2 | Number of baggers | 1 | 0,1, or 2 | Number of baggers; options are 0 baggers, 1 bagger for both lanes, or 2 baggers - one for each lane |
| All | Maximum number of items on front belt | 20 | 1 to 200 | Maximum number of items on front belt |
|  | Maximum number of items in bagging area | 20 | 1 to 200 | Maximum number of items on back belt and bagging area |
|  | Probability of basket icon | 0.5 | 0.0 to 1.0 | Probability a customer uses a basket (vs. cart) when their |

[Return to Input Form]

FIG. 10

Arrival Rate Schedule

Enter the number of arrivals per hour in each 15-minute time interval

| Time Interval | Number of Arrivals |
|---|---|
| 4:46 AM -- 5:00 AM | 0 |
| 5:01 AM -- 5:15 AM | 0 |
| 5:16 AM -- 5:30 AM | 0 |
| 5:31 AM -- 5:45 AM | 0 |
| 5:46 AM -- 6:00 AM | 0 |
| 6:01 AM -- 6:15 AM | 4 |
| 6:16 AM -- 6:30 AM | 12 |
| 6:31 AM -- 6:45 AM | 8 |
| 6:46 AM -- 7:00 AM | 20 |
| 7:01 AM -- 7:15 AM | 28 |
| 7:16 AM -- 7:30 AM | 20 |
| 7:31 AM -- 7:45 AM | 24 |
| 7:46 AM -- 8:00 AM | 28 |

Print Schedule   Return to Edit Form

Input Parameters For Front End Model 1 (Store Checkout)
February 24, 1999

Scenario Name: Default

Scenario Description: Default Case For FEM

| Parameter | Value | Range | Description |
|---|---|---|---|
| Start time of the simulation scenario (hours) | 6 | 0 to 24 (hours) | Start time of the simulation scenario in hour from midnight. Start time must be less than End time. |
| End time of the simulation scenario (hours) | 23 | 0 to 24 (hours) | End time of the simulation scenario in hours from midnight. End time must be greater than Start time. |
| Number of Fast-Track lanes | 1 | 0 to 47 | Number of Fast-Track lanes at the front-end. The total number of all lanes (Fast-Track + Express + Regular) cannot exceed 48. |
| Number of Express lanes | 3 | 0 to 47 | Number of Express lanes at the front-end. The total number of all lanes (Fast-Track + Express + Regular) cannot exceed 48. |
| Number of Regular lanes | 13 | 1 to 48 | Number of Regular lanes at the front-end. Must be at least 1 Regular lane. The total number of all lanes (Fast-Track + Express + Regular) cannot exceed 48. |

FIG. 14

Performance Statistics For Front End Model 1 (Store Checkout)
March 2, 1999

Scenario Name: Default

Scenario Description: Default Case For FEModel 1

| Performance Measure | Average | Standard Error | Minimum | Maximum |
|---|---|---|---|---|
| Scenario run length (minutes) | 1,020.00 | 0.00 | 1,020.00 | 1,020.00 |
| Number of customers served | 2,956.30 | 9.94 | 2,818.00 | 3,046.00 |
| Number of items purchased | 62,134.40 | 268.63 | 59,115.00 | 65,109.00 |
| Number of Fast-Track transactions | 287.97 | 2.75 | 254.00 | 315.00 |
| Number of Express transactions | 1,036.60 | 5.78 | 967.00 | 1,091.00 |
| Number of Regular transactions | 1,631.73 | 5.56 | 1,575.00 | 1,690.00 |
| Number of transactions with basket size less than or equal to Express limit | 1,359.13 | 7.35 | 1,260.00 | 1,438.00 |
| Fast-Track basket size | 21.13 | 0.24 | 18.65 | 23.50 |
| Express basket size | 5.42 | 0.02 | 5.15 | 5.73 |
| Regular basket size | 30.91 | 0.11 | 29.40 | 31.76 |
| Number of Fast-Track Items checked | 746.80 | 22.65 | 417.00 | 1,009.00 |
| Number of Fast-Track 30% audits | 28.23 | 0.96 | 18.00 | 40.00 |

FIG. 25

Performance Measures For Lane Model 2 (Nelson)
March 2, 1999

Scenario Name: *Default*

Scenario Description: *Default Case for LaneM2*

| Performance Measure | Average | Standard Error | Minimum | Maximum | Lane # |
|---|---|---|---|---|---|
| Scenario run length (minutes) | 60.00 | 0.00 | 60.00 | 60.00 | 0 |
| Total number of transactions lane 1 | 19.06 | 0.45 | 11.00 | 26.00 | 1 |
| Total number of transactions lane 2 | 18.88 | 0.45 | 11.00 | 24.00 | 2 |
| Total number of transactions both lanes | 37.94 | 0.88 | 22.00 | 50.00 | 0 |
| Total number of items lane 1 | 280.10 | 11.84 | 112.00 | 445.00 | 1 |
| Total number of items lane 2 | 267.88 | 10.15 | 123.00 | 421.00 | 2 |
| Total number of items both lanes | 547.98 | 18.92 | 258.00 | 858.00 | 0 |
| Queue size lane 1 | 0.88 | 0.14 | 0.09 | 5.71 | 1 |
| Queue size lane 2 | 0.82 | 0.11 | 0.06 | 3.71 | 2 |
| Queue size both lanes | 1.59 | 0.24 | 0.16 | 9.35 | 0 |

FIG. 26

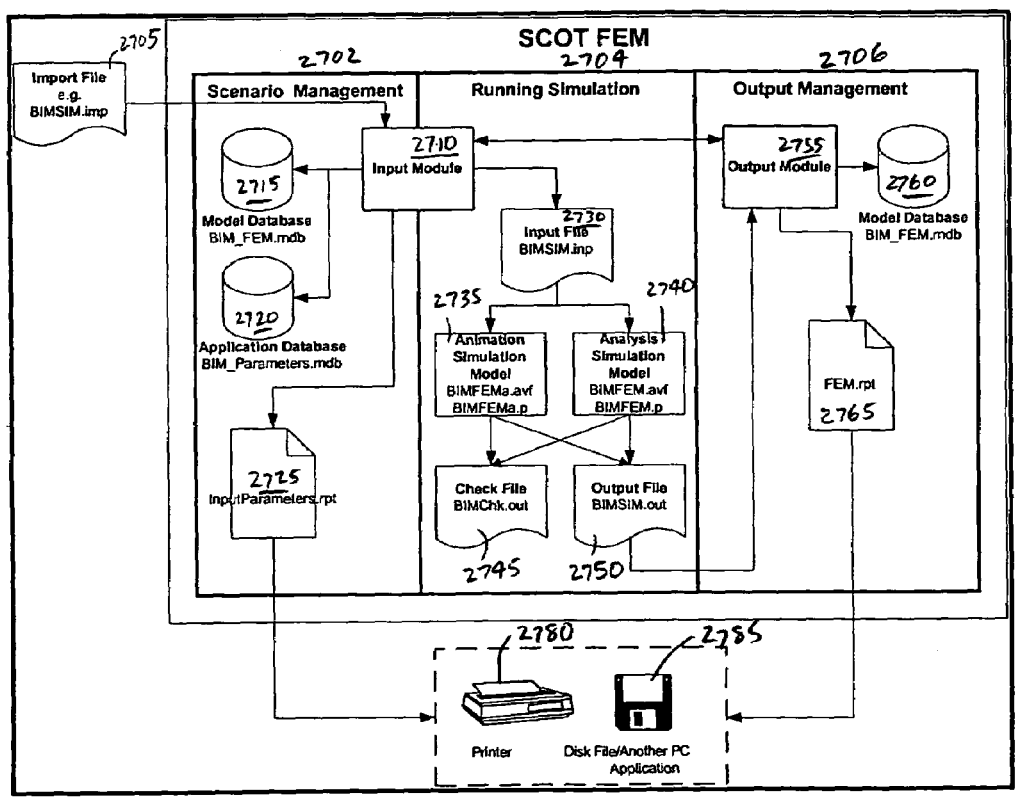
FIG. 27  SCOTFEM Process Flow Diagram

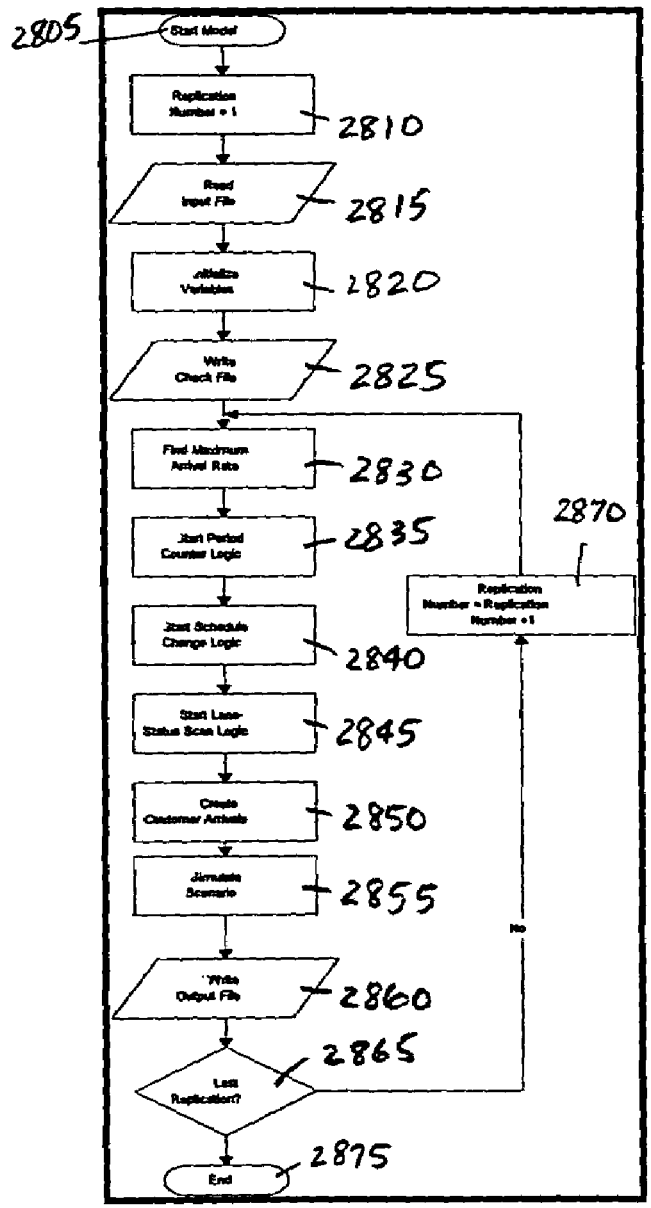
FIG. 28  Simulation Process

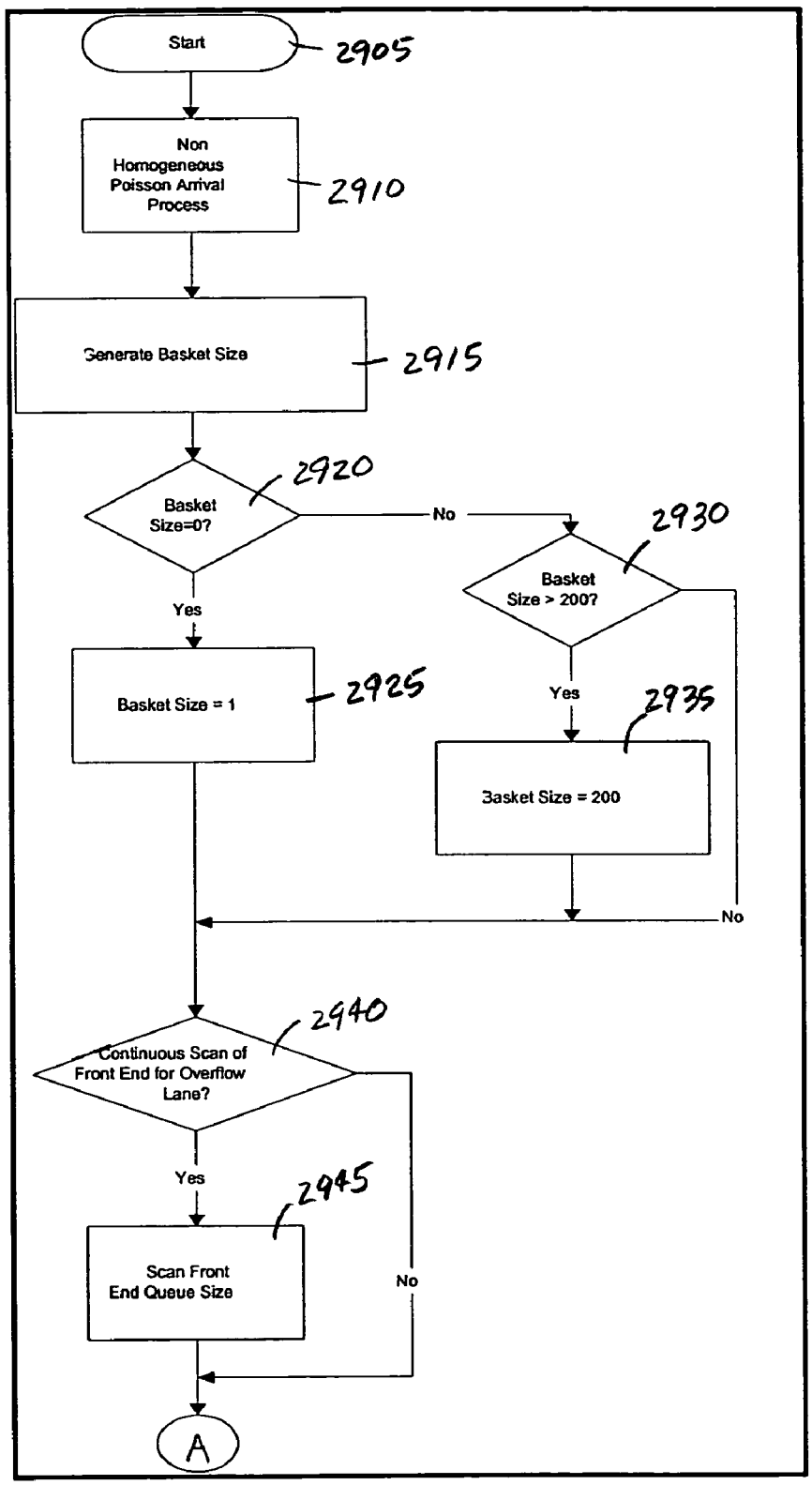
FIG 29 Customer Flow Process

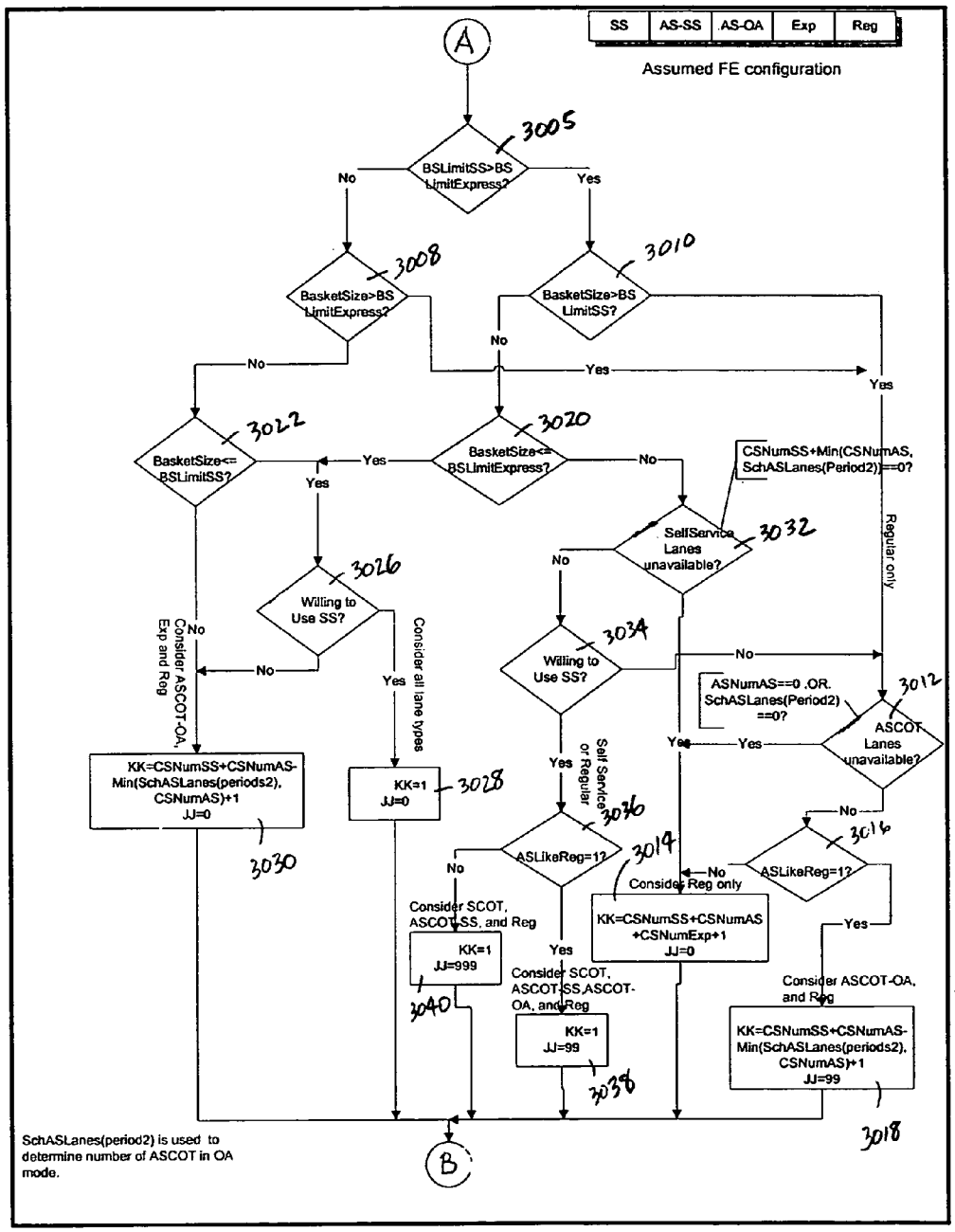
FIG. 30  Choose Lane Logic

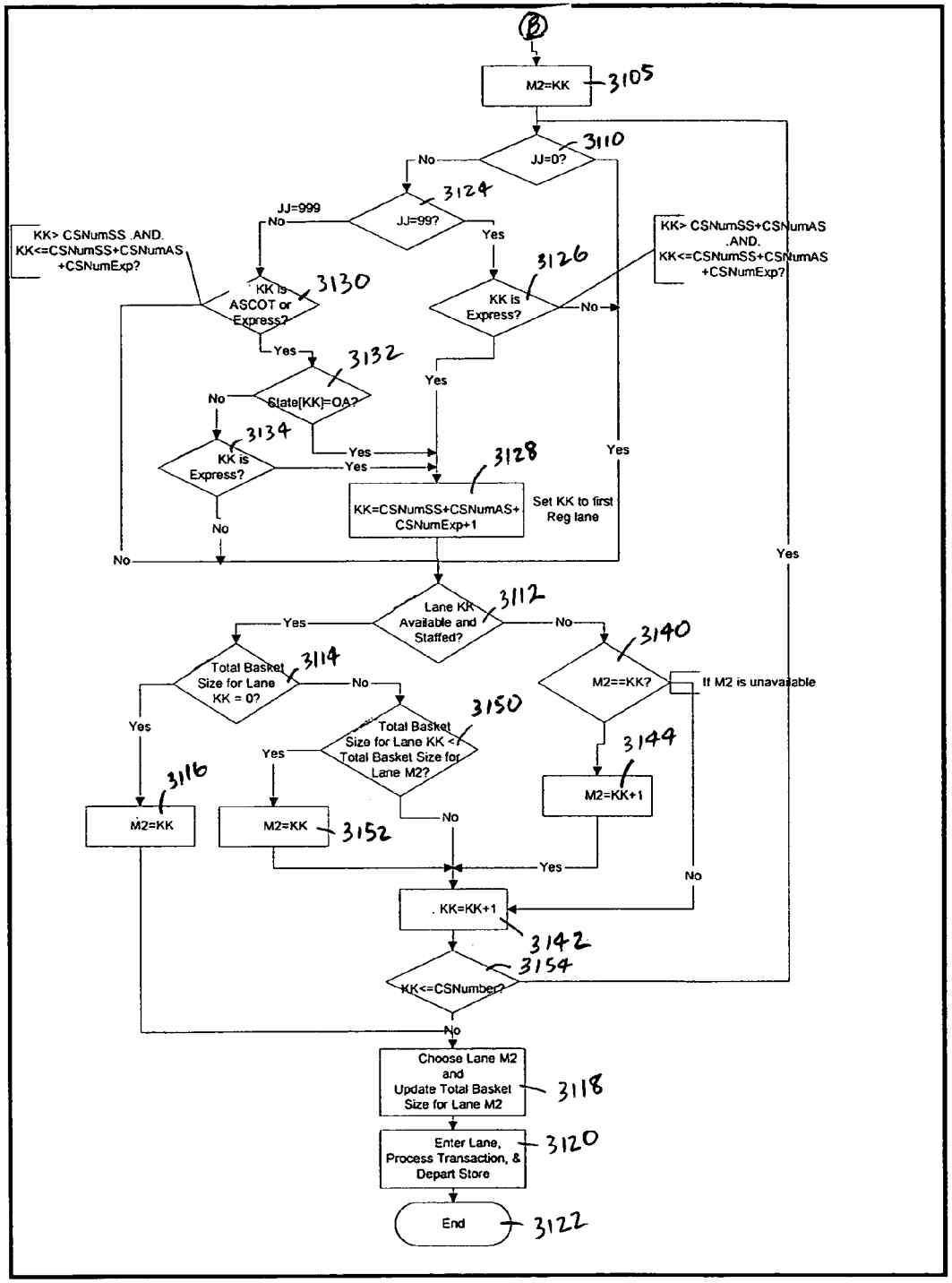
FIG 31  Choose Lane Logic - Continued

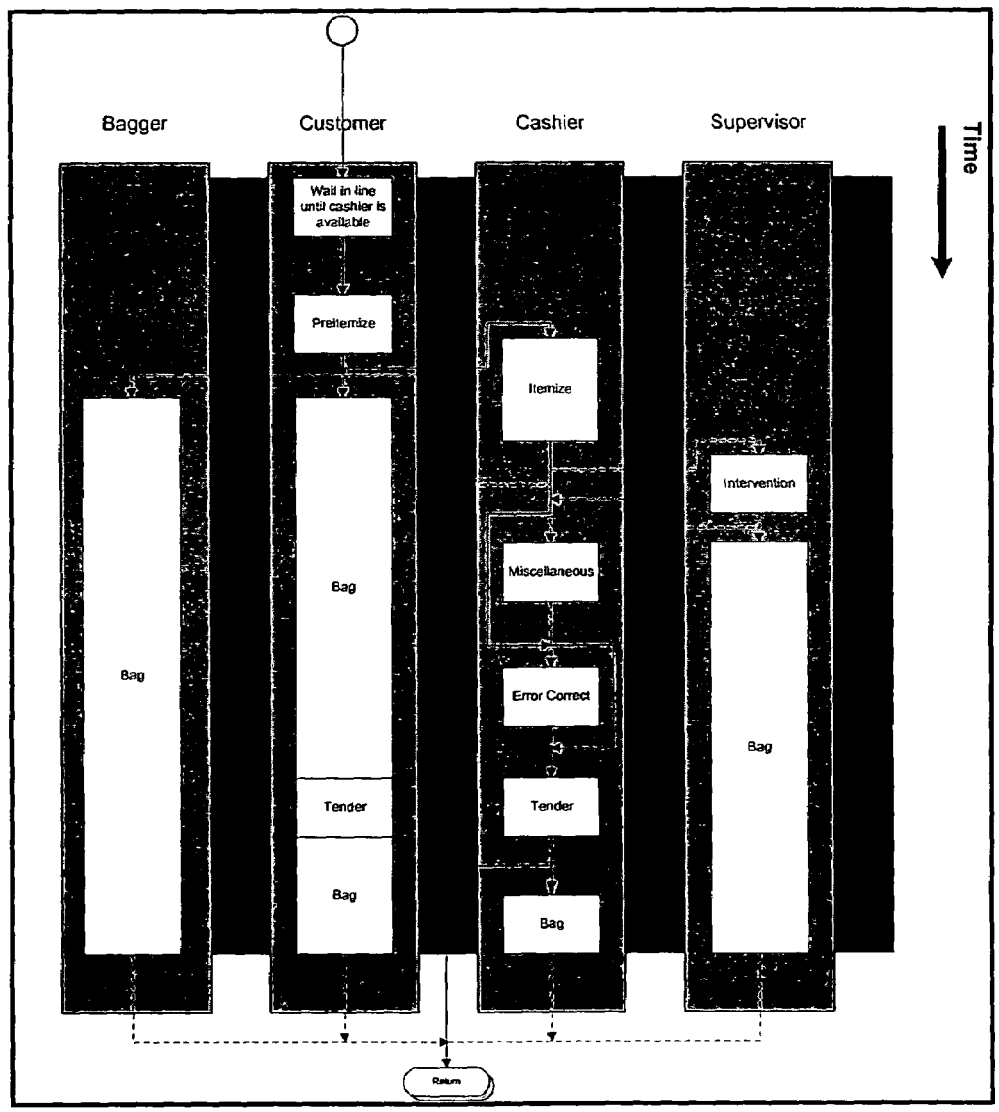
FIG 32  Transaction Process for Cashier Operated Lanes

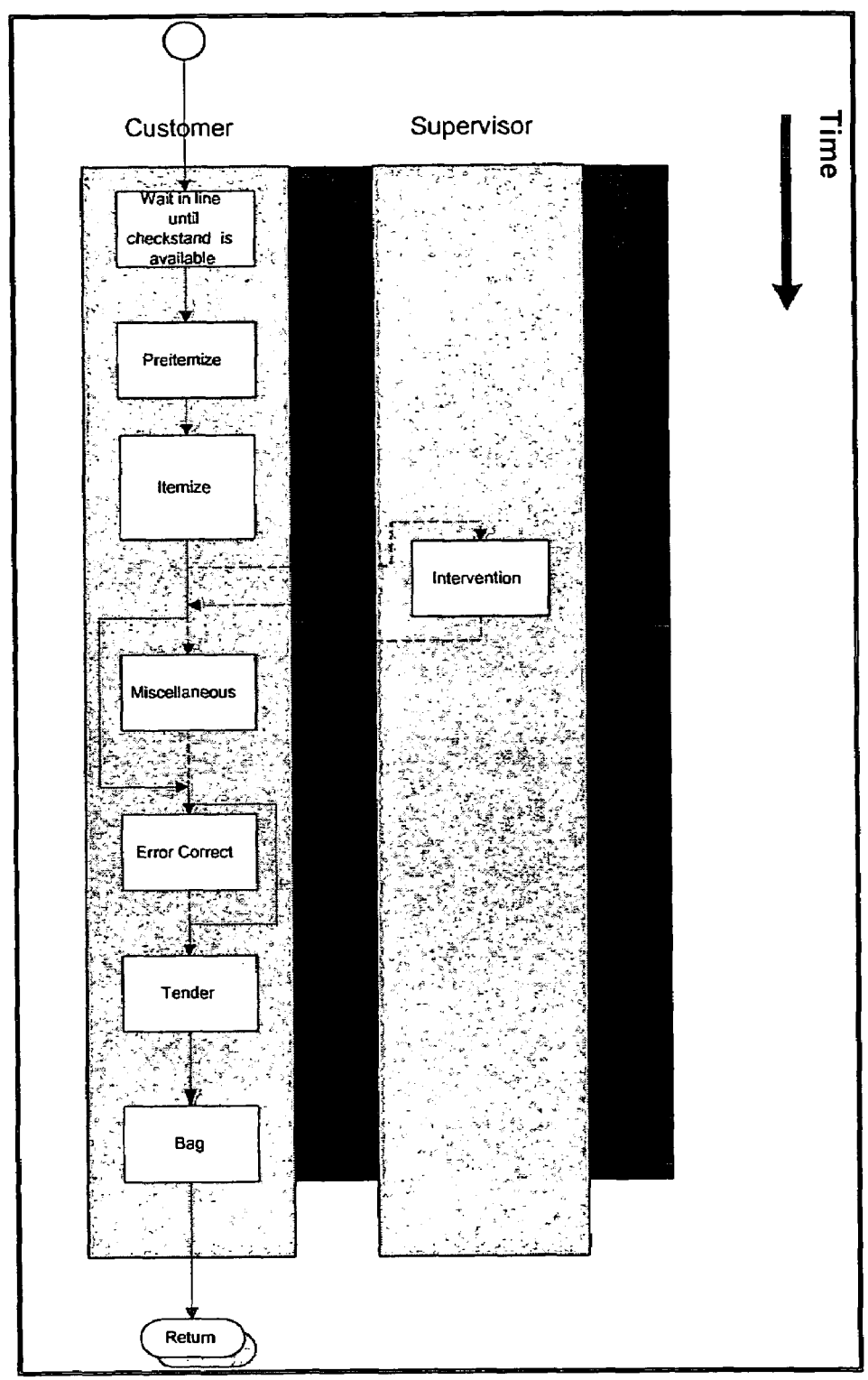
FIG 33 Transaction Process for Self-service Lanes

METHOD AND APPARATUS FOR LANE AND FRONT-END PLANNING AND DESIGN ANALYSIS

The present invention claims priority from a provisional application Ser. No. 60/151,629, filed on Aug. 31, 1999, entitled "Management Decision Modeling Software Applications" which is hereby incorporated by reference in its entirety into this specification. The present application is related to the application Ser. No. 09/653,195, entitled "Branch Effectiveness Model Application" filed on Aug. 31, 2000, now abandoned, which is hereby incorporated by reference in its entirety into the present specification.

FIELD OF THE INVENTION

The present invention relates generally to Management Decision Modeling (MDM), and more particularly, to a type of MDM used for modeling the front end of a retail store such as a grocery. Even more particularly, the present invention is related to an MDM called a Lane and Front-End Effectiveness Model (LFEM) used to predict the impact of changes to an existing or future retailer check stand or store front-end.

BACKGROUND OF THE INVENTION

Management Decision Models (MDM) are a class of software applications providing decision-makers with new information about their business that helps decision-makers address key business issues. MDM are flexible, data driven, software tools used to predict the effect of process, design, or technology changes on productivity and other business performance measures, as well as the financial impact of such changes. MDM may be customized to address questions relating to any business domain, including product manufacturing, service industry, and retail operations (e.g., grocery front-ends, convenience stores). MDM have graphical user interfaces. Components of a MDM include 1) a database management module to maintain the application's input data parameters and output data performance measures; 2) a simulation engine to represent the dynamic interaction between the elements of a system, such as, the people, equipment. material, information and energy; 3) animation to visualize how the system reacts to changes in input parameters; 4) an environmental design layout module for calculating physical space requirements to accommodate new equipment or process changes; and 5) a financial module which transforms operational performance measures into financial metrics including Return on Investment (ROI).

The output from a MDM indicates the predicted performance of the system using metrics that is the most meaningful to the decision-maker. The output includes operational performance measures, such as, queuing times or sizes, equipment utilization, number of stock-outs, and customer system times as well as financial metrics, such as ROI, Net Present Value (NPV), and Payback Period.

There are no MDMs that are currently available to characterize an existing or future retailer's check stand or store front-end to address complex design and operational problems that are quantitatively difficult to solve.

There are no computer software applications that are currently available to address complex retailer's check stand or store front-end design and operational problems using the methodology and features provided by this present invention. Thus, a need exists in the art for an LFEM which has the flexibility, features and functionality to address strategic issues relating to check stand and store front-end design and operational issues.

SUMMARY OF THE INVENTION

It is, therefore, an object of the present invention to provide a model for predicting the impact of changes to retail and financial customer service points.

It is another object of the present invention to provide a model to predict the impact of changes to an existing or future retailer check stand or store front-end.

It is another object of the present invention to provide a simulation model which shows an animation and outputs results based on changes to the existing or future retailer check stand or store front-end.

Yet another object of the present invention is to provide a simulation model having numerous parameters such as the user with little or no-simulation or modeling experience can easily use the simulation model.

The Lane and Front-end Effectiveness Model (LFEM) is a self-contained PC desktop application that allows an analyst to quantitatively predict the impact of changes to their checkout operations. This application, according to the present invention, includes four simulation models representing the complex interactions between customers, staff, and checkstand resources. Three of these models are detailed lane models and the fourth is a store front-end checkout model. An analyst can use the LFEM to evaluate, in detail, different checkstand configurations and transaction processes and the effect these changes have on overall front-end performance. The purpose of this application is to provide retailers with timely information to reduce the risk and uncertainties of investing in new technologies or design changes by predicting their impact and return before committing resources to their acquisition or implementation.

LFEM is a decision support software application that assists retail management in making strategic business decisions. The LFEM is inventive because it addresses business problems in a unique way. LFEM is a flexible, data-drive and integrated software tool. It is flexible so the user can address an unlimited number of process or design issues relating to check stand and store front-end operations. It is data driven so the user can customize a model to a particular problem by entering the appropriate values into the input data parameters. It is integrated so the user can apply one or more components of the tool to address their business questions. Another key concept about LFEM is that it is designed to be usable by individuals that are knowledgeable about the application domain and not necessarily knowledgeable about the tool's methodology. In summary, LFEM provides a structured, quantitative approach to address check stand and store front-end business issues and help retailers profitably manage and grow their business.

An analyst can use the LFEM along with data that characterizes an existing or future retailer's check stand or store front-end to address complex design and operational problems that are quantitatively difficult to solve. Its purpose is to provide an approach to improve the likelihood the retailer selects the right set of new technologies, check stand design changes and operating procedures by predicting their impact before committing to implementation.

LFEM is a software application that provides retail management with new information about their check stand and store front-end operation that will help them address key business issues. LFEM is a flexible, integrated, data-driven software tool that predicts the effect of process, design or technology changes on productivity and other business performance measures as well as the financial impact of such changes. It can be customized to address questions relating to any financial impact of such changes. It can be customized to address questions relating to any check stand or store front-end operations and customer service. Components of LFEM include:

- a database management module to maintain the application's input data parameters and output data performance measures,
- a simulation engine and multiple simulation models to represent the dynamic interaction between the elements of a system, such as the retailer" personnel (cashiers, baggers, supervisors, etc.), check stand configurations, customers and operating procedures,
- animation to visualize how the system reacts to changes in input parameters,
- an environmental design layout module which calculates physical space requirements to accommodate new equipment or process changes (still under development),
- a financial module which transforms operational performance measures into financial metrics including Return on Investment (still under development).

The output from LFEM indicates the predicted performance of the system using metrics most meaningful to the decision-maker. They would include operational performance measures, such as queuing times or sizes, equipment utilization, number of transactions and customer system times as well as financial metrics, such as ROI, NPV and Payback Period.

These and other objects of the present invention are achieved by a method of quantitatively evaluating alternatives to check-out operations using a simulation model. Parameter values are input describing check-out operations into the simulation model. The simulation model is run and results are outputted from the simulation model.

Still other objects and advantages of the present invention will become readily apparent to those skilled in the art from the following detailed description, wherein the preferred embodiments of the invention are shown and described, simply by way of illustration of the best mode contemplated of carrying out the invention. As will be realized, the invention is capable of other and different embodiments, and its several details are capable of modifications in various obvious respects, all without departing from the invention. Accordingly, the drawings and description thereof are to be regarded as illustrative in nature, and not as restrictive.

BRIEF DESCRIPTION OF THE DRAWINGS

The present invention is illustrated by way of example, and not by limitation, in the figures of the accompanying drawings, wherein elements having the same reference numeral designations represent like elements throughout and wherein:

FIG. 9 depicts an edit parameter file form for a Nelson lane model 2;

FIG. 10 depicts an arrival rate schedule form;

FIG. 14 depicts input parameters for front-end model;

FIG. 25 is performance statistics for the front-end model 1;

FIG. 26 is performance measures for lane model 2;

FIG. 27 is a SCOT FEM process flow diagram;

FIG. 28 is a high-level flow diagram of the simulation process;

FIG. 29 is a flow diagram depicting the customer flow process;

FIG. 30 is a flow diagram depicting the choice of lane logic;

FIG. 31 is a continuation of the FIG. 30 flow diagram;

FIG. 32 is transaction process for cashier operated lanes; and

FIG. 33 is a transaction process for self-service lanes.

BEST MODE FOR CARRYING OUT THE INVENTION

A method and apparatus for evaluating an existing or future retailer check stand or store front-end are described. In the following description, for purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Hardware Overview

Figure 1:
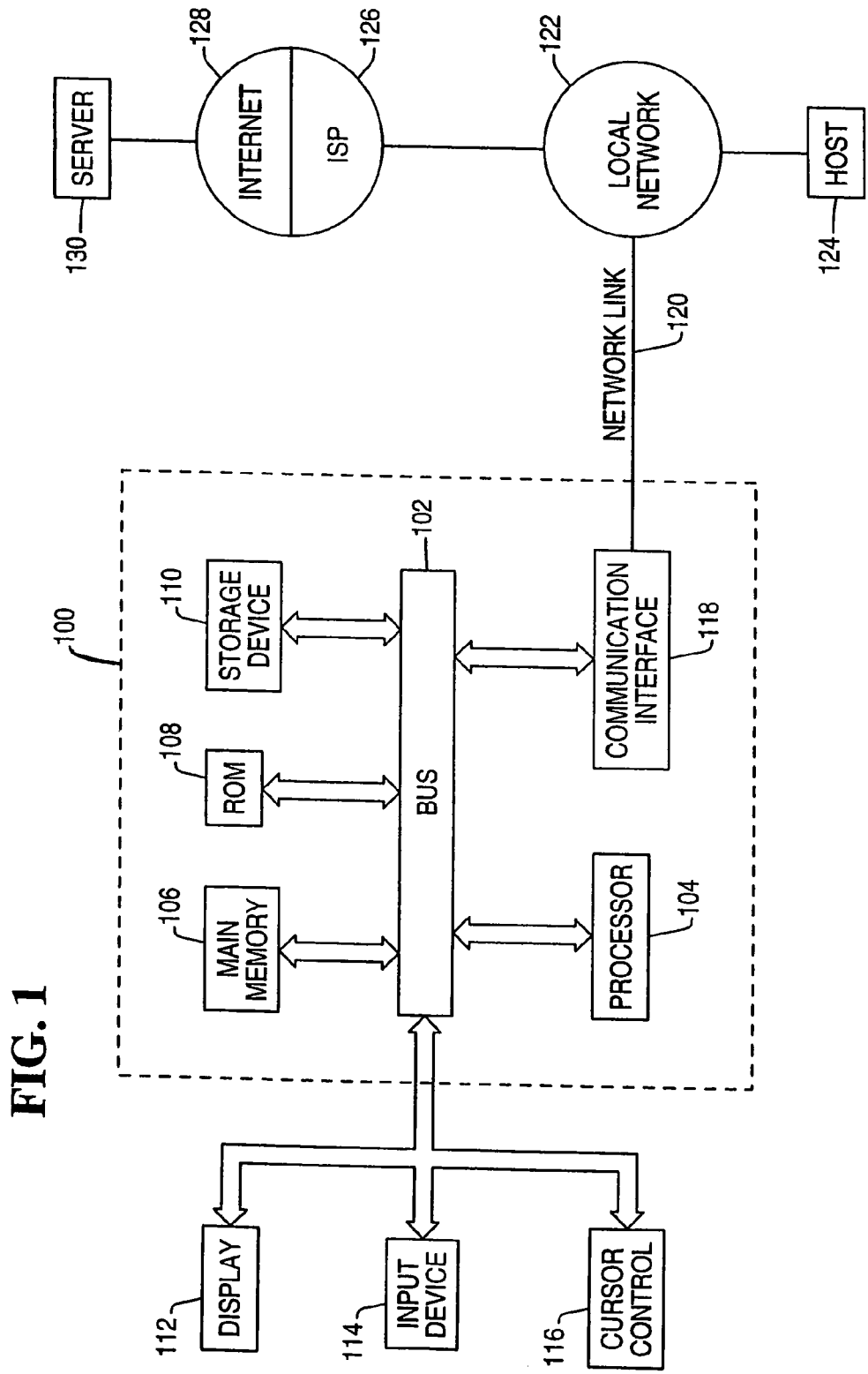
FIG. 1 is a high-level block diagram of a computer system usable with the present invention.

FIG. 1 is a block diagram illustrating an exemplary computer system 100 upon which an embodiment of the invention may be implemented. The present invention is usable with currently available personal computers, mini-mainframes and the like.

Computer system 100 includes a bus 102 or other communication mechanism for communicating information, and a processor 104 coupled with the bus 102 for processing information. Computer system 100 also includes a main memory 106, such as a random access memory (RAM) or other dynamic storage device, coupled to the bus 102 for storing information and instructions to be executed by processor 104. Main memory 106 also may be used for storing temporary variables or other intermediate information during execution of instructions to be executed by processor 104. Computer system 100 further includes a read only memory (ROM) 108 or other static storage device coupled to the bus 102 for storing static information and instructions for the processor 104. A storage device 110, such as a magnetic disk or optical disk, is provided and coupled to the bus 102 for storing information and instructions.

Computer system 100 may be coupled via the bus 102 to a display 112, such as a cathode ray tube (CRT) or a flat panel display, for displaying information to a computer User. An input device 114, including alphanumeric and other keys, is coupled to the bus 102 for communicating information and command selections to the processor 104. Another type of User input device is cursor control 116, such as a mouse, a trackball, or cursor direction keys for communicating direction information and command selections to processor 104 and for controlling cursor movement on the display 112. This input device typically has two degrees of freedom in two axes, a first axis (e.g., x) and a second axis (e.g.,) allowing the device to specify positions in a plane.

The invention is related to the use of a computer system 100, such as the illustrated system, to display a lane front-end model. According to one embodiment of the invention, the lane front-end model and display is provided by computer system 100 in response to processor 104 executing sequences of instructions contained in main memory 106. Such instructions may be read into main memory 106 from another computer-readable medium, such as storage device 110. However, the computer-readable medium is not limited to devices such as storage device 110. For example, the computer-readable medium may include a floppy disk, a flexible disk, hard disk, magnetic tape, or any other magnetic medium, a CD-ROM, any other optical medium, punch cards, paper tape, any other physical medium with patterns of holes, a RAM, a PROM, an EPROM, a FLASH-EPROM, any other memory chip or cartridge, a carrier wave embodied in an electrical, electromagnetic, infrared, or optical signal, or any other medium from which a computer can read. Execution of the sequences of instructions contained in the main memory 106 causes the processor 104 to perform the process steps described below. In alternative embodiments, hard-wired circuitry may be used in place of or in combination with computer software instructions to implement the invention. Thus, embodiments of the invention are not limited to any specific combination of hardware circuitry and software.

Computer system 100 also includes a communication interface 118 coupled to the bus 102. Communication interface 108 provides a two-way data communication as is known. For example, communication interface 118 may be an integrated services digital network (ISDN) card or a modem to provide a data communication connection to a corresponding type of telephone line. As another example, communication interface 118 may be a local area network (LAN) card to provide a data communication connection to a compatible LAN. In the preferred embodiment communication interface 118 is coupled to a virtual blackboard. Wireless links may also be implemented. In any such implementation, communication interface 118 sends and receives electrical, electromagnetic or optical signals which carry digital data streams representing various types of information. Of particular note, the communications through interface 118 may permit transmission or receipt of the lane front-end model. For example, two or more computer systems 100 may be networked together in a conventional manner with each using the communication interface 118.

Network link 120 typically provides data communication through one or more networks to other data devices. For example, network link 120 may provide a connection through local network 122 to a host computer 124 or to data equipment operated by an Internet Service Provider (ISP) 126. ISP 126 in turn provides data communication services through the world wide packet data communication services through the world wide packet data communication network now commonly referred to as the "Internet" 128. Local network 122 and Internet 128 both use electrical, electromagnetic or optical signals which carry digital data streams. The signals through the various networks and the signals on network link 120 and through communication interface 118, which carry the digital data to and from computer system 100, are exemplary forms of carrier waves transporting the information.

Computer system 100 can send messages and receive data, including program code, through the network(s), network link 120 and communication interface 118. In the Internet example, a server 130 might transmit a requested code for an application program through Internet 128, ISP 126, local network 122 and communication interface 118. In accordance with the invention, one such downloaded application provides for information discovery and visualization as described herein.

The received code may be executed by processor 104 as it is received, and/or stored in storage device 110, or other non-volatile storage for later execution. In this manner, computer system 100 may obtain application code in the form of a carrier wave.

The LFEM application provides an approach to quickly assess the impact of changes to checkstand or front-end designs and procedures without incurring unnecessary costs. This software tool has a Graphical User Interface (GUI) that allows the User to:

Input and manage data that characterizes a particular scenario

Select and run one of the corresponding simulation models

View and write the simulation results to a file or printer

The LFEM application includes two sets of simulation models. The first model set includes three, 2-Lane models. In each model, two checkstands are positioned side-by-side. LFEM lane models include the following types of checkstands:

Front-facing checkstands (conventional)

Back-to-back checkstands (Nelson)

Front-facing checkstands for fast-track customers

This set of models allows a User to analyze, in detail, changes in checkstand designs, transaction procedures, and lane configurations.

The second set of models includes a single model representing the entire front-end checkout operation. The objective of this model is to predict the impact of changes in checkstand designs, transaction procedures, and front-end operating policies on overall front-end performance. The User can create scenarios that characterize a store's front-end operations. For example, the User can specify the number and type (fast-track, express, regular, self-service, or self-service-convertible) of checkstands, transaction times, customer arrival patterns and basket sizes, and labor schedules.

The LFEM includes Input, Run Simulation and Output Modules.

The Input Module allows the User to create and manage input data scenarios that characterize event times, logic, and configuration for all of the 2-Lane and the front-end simulation models. For example, the User may create a scenario that says baggers support only the regular lanes and then enter the number of available baggers in 30-minute intervals throughout the day for the Front-end model. Each of the models in the LFEM has a Data Input Dictionary (DID) that lists and defines all the parameters under the User's control.

The Run Simulation Module allows the User to select one of the models and an input scenario, and run the simulation. Each of the simulation models can run with or without animation. A model with the animation turned on is more effective for understanding and communicating the model's results. In many cases the animation provides a visual check that the model is running the way the User expects. There are also several screen views that provide additional insight when the model is run with animation. With the animation off, the models execute much faster, allowing the User to conduct more statistically sound experiments and evaluate more scenarios in a shorter time period. This mode of running scenarios is called the analysis mode.

The Output Module allows the User to view and write the results of the simulation to a file or printer. The model output includes performance measures like cashier utilization, labor times, queue times, queue lengths, and transaction volumes.

The 2-Lane models are flexible, data driven simulation models that represent the transaction process at the checkstand. By data driven, we mean the User specifies input parameter values that control the model's event times, logic, and resource configuration. This allows the User to analyze an unlimited number of "What-if" scenarios without having to modify the simulation models. Each model has a Data Input Dictionary (DID) that lists and defines all the parameters used in the model.)

There are three, 2-Lane models in the LFEM application:
LaneM1—Model that represents the transaction process at two front-facing checkstands (conventional)
LaneM2—Model that represents the transaction process at two back-to-back checkstands (Nelson)
LaneM3—Model that represents the transaction process at two front-facing checkstands for fast-track customers This set of models allows the User to analyze, in detail, changes in checkstand designs, transaction procedures, and lane configurations. For example, one can use a 2-Lane model to evaluate the side-by-side comparison of different transaction procedures, checkstand equipment, or cashier performance. Alternatively, one could use two of the 2-Lane models to evaluate the performance differences between the checkstand designs. For instance, one question might be "what is the trade-off between capacity and labor cost when using two traditional checkstands with two baggers compared to two back-to-back checkstands that share one bagger?" The overall goal of these models is to provide a retailer with decision-making information about checkstand designs and transaction procedures, so they can better manage and grow their business.

The following five steps illustrates the basic process represented in each of the 2-Lane models:
1. A customer "arrives" at a checkstand
2. The customer may have to wait before they can receive service
3. Once the lane's resources are available the transaction process begins
4. The customer and the lane's resources work together to complete the transaction
5. After the transaction is finished, the customer departs the lane Each of the 2-Lane models allows the User to represent customer demand in one of two ways: Unlimited or Limited Arrival mode. In the Unlimited Arrival mode, there is always a customer available to receive service when a lane has capacity (an ideal situation). In this mode, the User can evaluate the maximum throughput (defined as either the number of transactions or items per time unit) of a checkstand. In the Limited Arrival mode, there is a time interval between customer arrivals. The User can enter the mean inter-arrival time (i.e., the arrival rate) and whether the inter-arrival distribution is constant or random. The Limited Arrival mode is used to evaluate customer queuing behavior. In general, the Limited Arrival mode is, perhaps, more representative of the actual customer checkout process.

Representing the transaction process is an important part of modeling the customer checkout process. The 2-Lane models represent the transaction process by tracking the movement of items during the transaction. These models breakdown the transaction process into the following events.
Pre-itemization
    Customer unloads items on the front-belt at a checkstand
Itemization
    Cashier enters (scan, key, or weigh and key) items in the POS system and places items on the back-belt.
    Possible enter-item resolution events (e.g., item not-on-file, etc.)
Finalization
    Cashier processes the tender event by tender type
    Possible frequent shopper event
    Possible tender resolution event (e.g., check verification, etc.)
Bagging
    The customer, cashier, bagger, or combination of the three bags the customer's items
Intervention
    Requires a super helper to resolve a transaction problem at a checkstand The User can specify the duration of these events, the frequency of these events, and which resource can perform some of these events. The transaction logic for LaneM3 (checkout for fast-track customers) differs slightly from the above descriptions. The main difference is Pre-itemization, Itemization, and Bagging events only occur in the transaction if a customer is audited.

The logic in the 2-Lane models also makes the following assumptions.
1. A customer can unload their items (Pre-itemization) as long as there is space available. The maximum space available for a lane is an input parameter.
2. Pre-itemization and itemization can occur simultaneously.
3. Itemization cannot start for the next customer until the next customer unloads an item and the bagging event of the previous customer is finished (or if the cashier can switch to a scan and bag operation—for LaneM2 only).
4. Finalization cannot start until itemization is finished and requires both the cashier and customer.
5. Depending upon who bags, the bagging operation can begin as soon as the Cashier finishes entering an item into the POS system and places it on the back-belt.
6. The intervention event can occur after the finalization event and requires a super helper.
7. Cashiers can stop the itemization task when the back-belt (and bagging area) is full and bag all entered items on the back-belt (assuming the cashier bagging rule for that lane is "on") and then resume the itemization task.

8. In LaneM3, there is a "Problem Item Event" for difficult or "non-scanable" items, e.g., mark downs and Not-on-File items. This event would occur for all Transactions and before the Audit Transaction decision.
9. In LaneM3, there are three mutually exclusive events: 1) no audit, 2) 30% audit, and 3) 100% audit. The User enters the probability of an audit occurring.
10. Lane priority for bagging logic with 1 bagger will be FIFO, i.e., order in which the requests occur.
11. In LaneM3, the User can enter a time delay to represent "Chunter time" or item registration time per item when a no audit or 30% audit occurs.

The front-end model represents the interactions between customers, staff, and store resources during the checkout process at a typical grocery store front-end. Like the 2-Lanes models, the Front-end model is flexible and data driven. The primary difference is this model represents the overall front-end operations and not just the checkout process at a single checkstand. As a result of this larger scope, the Front-end model does not go into the level of detail in the transaction process (i.e., the movement of items) that the 2-Lane models provide.

There are two primary types of resources represented in the Front-end model, checkstands and labor.

The front-end model currently represents up to five different types of checkstands: fast-track, express, regular, self-service, and self-service convertible. Fast-track lanes only accept fast-track customers (a customer belonging to a retailer's loyalty program with preferred checkout privileges). Self-service lanes are check stands where customers perform the transaction process themselves. Self-service convertible lanes are check stands that can be converted back and forth between self-service and cashier operated modes. The User enters the number and type of checkstands available for a scenario with the requirement that at least one lane is a regular lane (and at least one lane is a fast-track lane if the User represents this type of transaction). Fast-track, express, regular and a self-service convertible (in cashier mode) require a cashier (or an overflow resource to operate overflow lanes) to process a transaction.

The model represents four types of labor: cashiers, baggers, super helpers, and overflow resources. The User can specify labor schedules (i.e., the number of staff available in 30 minutes intervals) for cashiers, baggers and supper helpers. The number of overflow resources is a single input value that does not change during a scenario. Furthermore, the User needs to input cashier schedules by type of lane (fast-track, express, and regular). The front-end model assigns scheduled baggers to a "bagger pool" and the scheduled baggers are able to assist any lanes that requests a bagger. The model uses input parameters to determine which type of lane can request a bagger. Super helpers are also scheduled in a pool and are available for customer interventions or to bag on a first-come-first-serve basis for any lane.

The following 6-steps describe the basic customer flow represented in the Front-end model.
1. A customer "arrives" at the front-end with a basket of items, a desired tender type to use, and an inclination to use fast-track or not. The User enters the expected number of arrivals per hour in 15-minute intervals.
2. A customer selects a checkstand to use. First, the customer determines the set of available (open) lanes based on lane basket size and tender type restrictions, and on whether the customer is using fast-track. Then, the customer chooses a lane from this available set that has the smallest total lane basket size. The lane basket size is the sum of all the items for each customer in the lane.
3. The customer enters the selected lane and may have to wait before the customer can receive service.
4. Once the lane's resources are available the transaction process begins.
5. The customer and the lane's resources work together to complete the transaction (see the description of the transaction logic below).
6. After the transaction is finished, the customer leaves the lane and departs the store. The User specifies whether a bagger can assist a customer to their car.

The front-end model represents the transaction process using the following events. The User can enter input parameters that govern these events by lane type.

Pre-itemization
This occurs only if a customer enters an open lane that is idle (e.g., the cashier is waiting for a customer to arrive). The pre-itemization event represents the time to unload items per transaction at a checkstand.

Itemization
The itemization event represents the time for the cashier to enter items at the POS system. The User enters parameter times per item by lane type.

Finalization
The finalization event represents the tender time per transaction by tender type. Also included in the finalization process is a reward event.

Bagging
The bagging event represents the time to bag a customer's items. This event will occur in parallel with the transaction after itemization begins if a bagger, super-helper, or customer is available to bag. Otherwise, the bagging event will occur subsequent to the completion of the finalization (or intervention) event by the cashier.

Intervention
The intervention events represents all types of miscellaneous or resolution activities for a transaction. This event, if it occurs, will follow the finalization event and will require a super helper's assistance.

Logic for fast-track lanes will represent problem items, item registration time, and the probability of a 100% and 30% audit.

Figure 2:
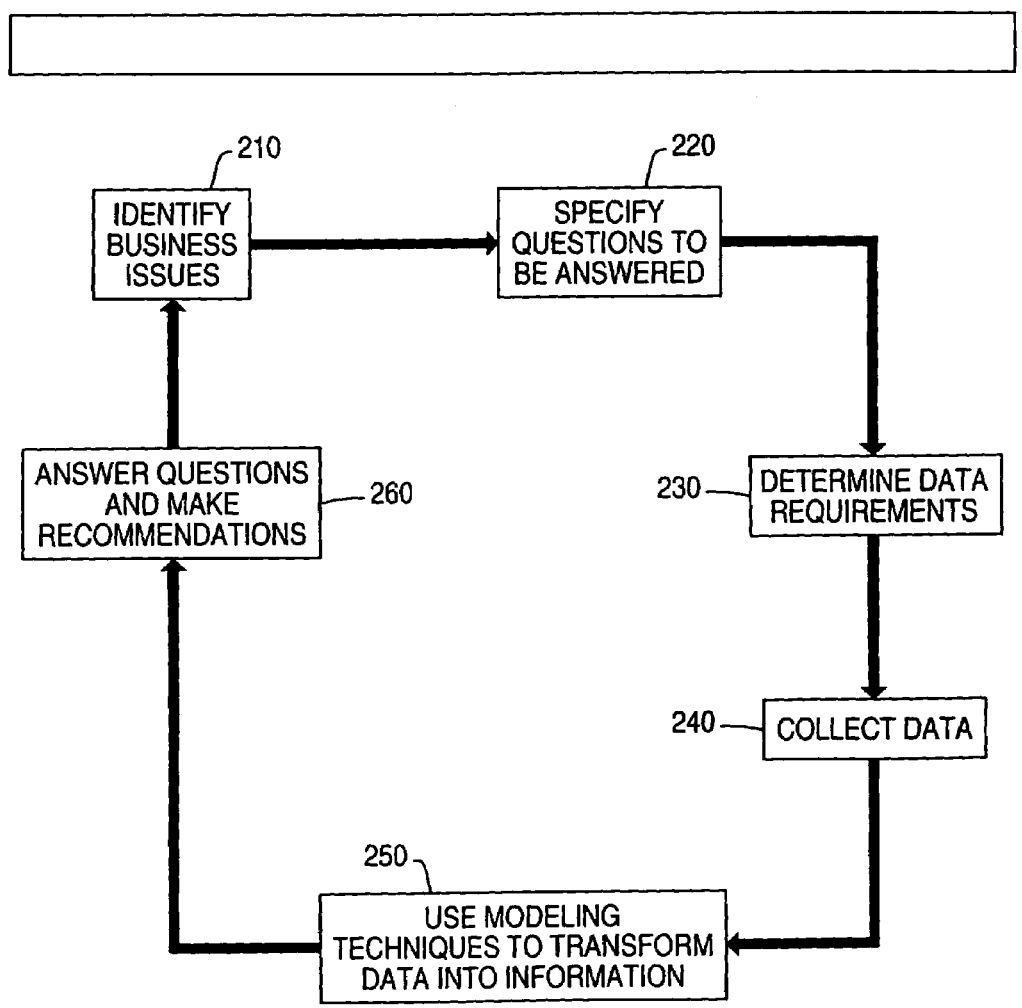
FIG. 2 is a flow diagram overviewing a customer engagement process.

Referring now to FIG. 2, an overview of a customer engagement process is depicted. At step 210 business issues are identified. At step 220 the questions are specified that have to be answered. At step 230 data requirements are determined. At step 240 data is collected. At step 250 modeling techniques are used to transform data into information. At step 260 the User answers questions and makes recommendations based upon the output of the modeling techniques. At step 210 the process can be continued in a circular fashion until the modeling technique is completed. The FIG. 2 diagram is an overview of the MDM process.

Figure 3:
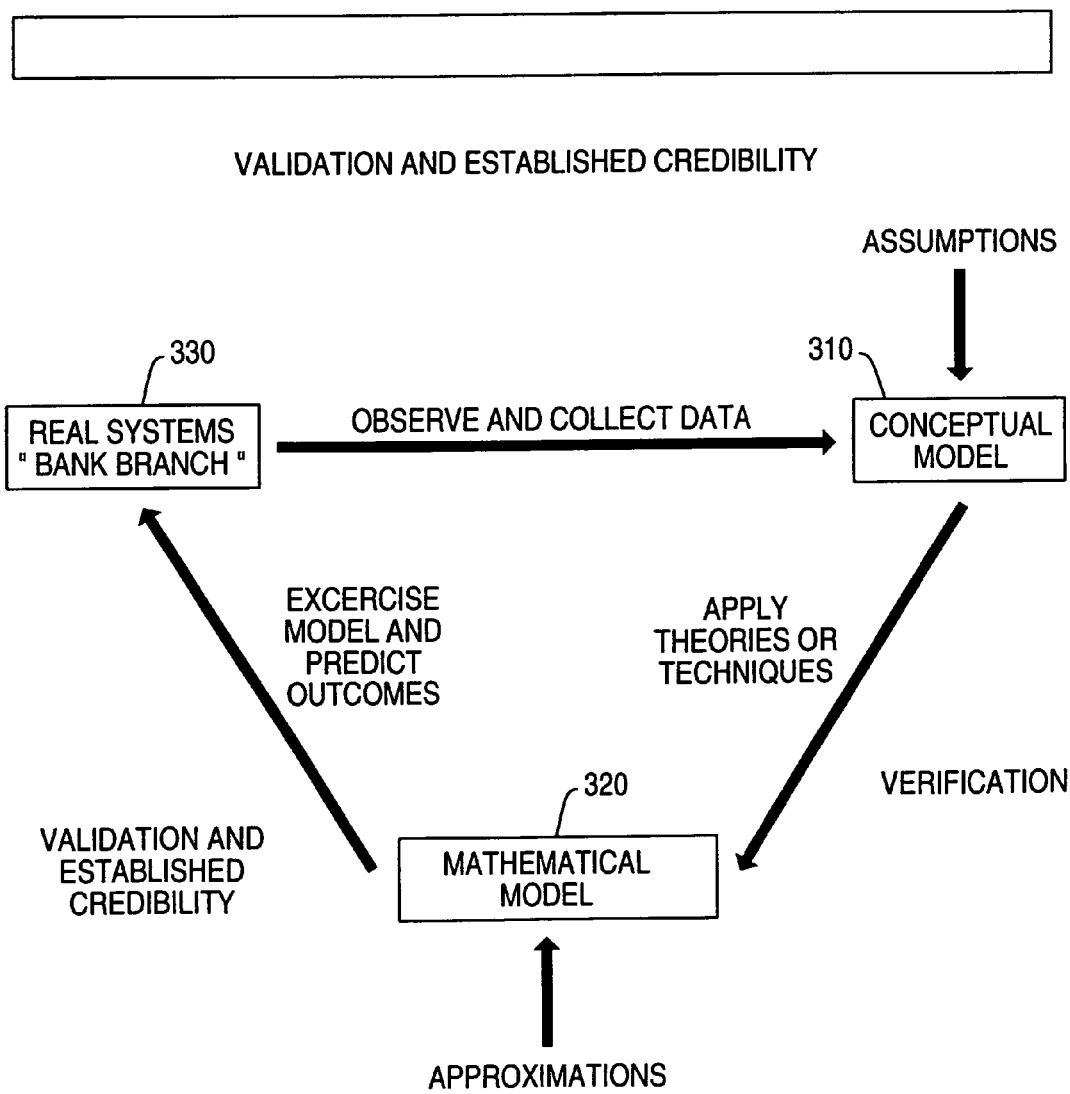
FIG. 3 is a flow diagram overviewing a modeling process.
Figure 4:
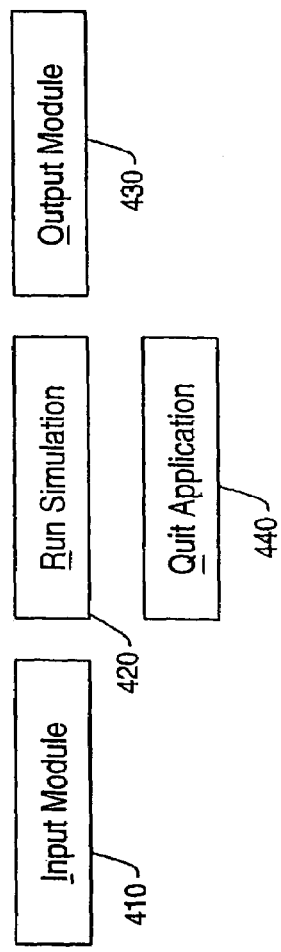
FIG. 4 depicts a lane and front-end effectiveness model main menu form.

FIG. 3 is an overview of the modeling process (e.g., Bank Branch design) used in FIG. 2 and more specifically the modeling technique of step 250 in FIG. 2. The modeling process must be validated and creditability established for the modeling process to be effective. First assumptions must be made and incorporated into the conceptual model 310. The output from the conceptual model is input into a mathematical model 320 which includes approximations. The mathematical model is exercised and outcomes are predicted by checking the mathematical model against the real systems bank branch 330. Data is collected and the bank branch is observed to validate and establish credibility for the mathematical model.

From the Main Menu form 400, the User can enter an Input Module 410, a Run Simulation 420, or an Output module 430 selecting the corresponding button with their mouse, other point device or keyboard.

When finished, the User can close the LFEM application by selecting a Quit Application button 440. This is the only form that has the Quit Application button 440, so the User must return to the Main Menu form 400 to close the LFEM tool.

Figure 5:
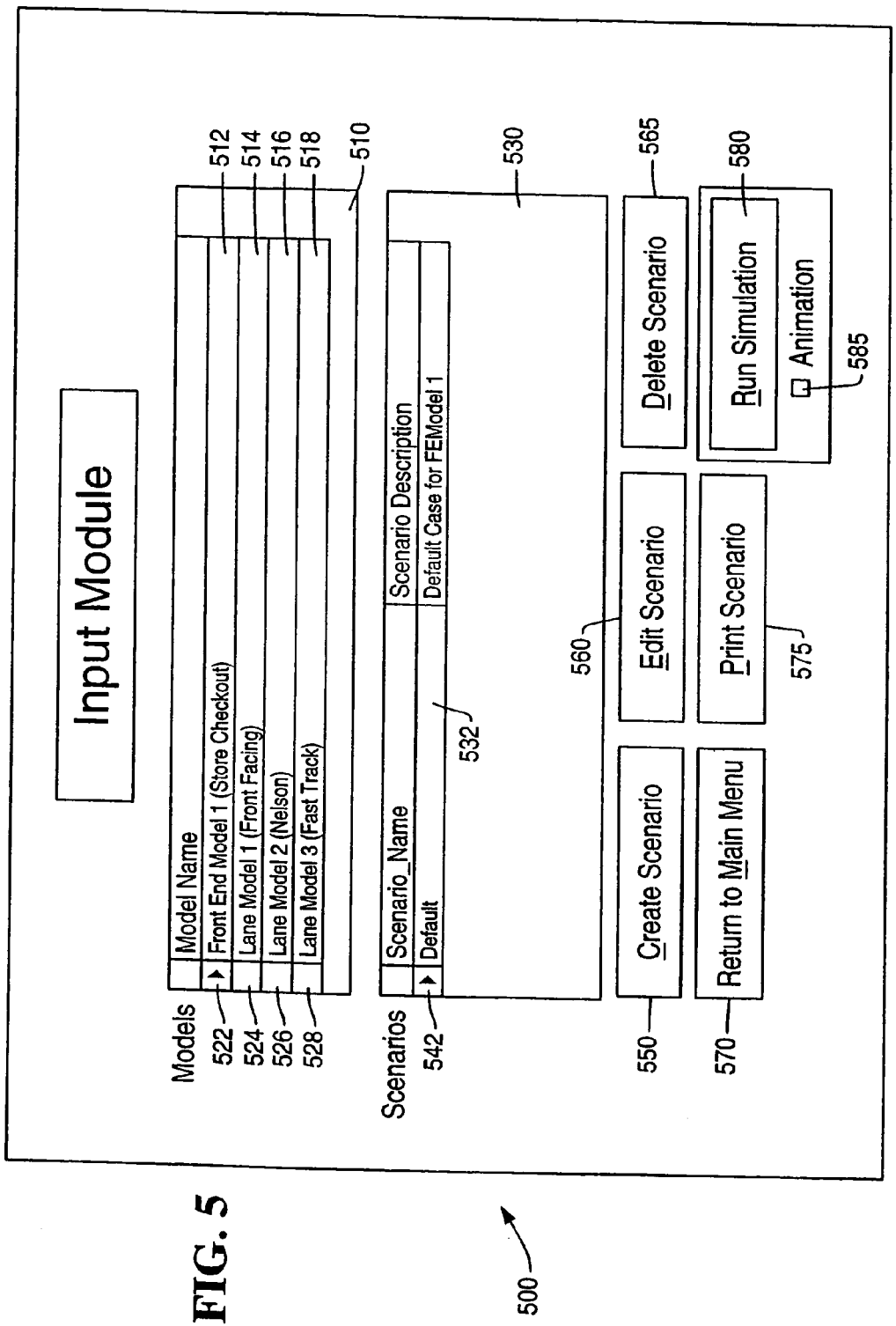
FIG. 5 depicts a front-end model input module form.

FIG. 5 depicts an Input Module form 500. The Input Module 410 allows the User to create, save, edit, delete and print input parameter files that specify model scenarios. The User can also run a simulation scenario with and without animation from the Input Module form 500. The User can perform these operations by first selecting the type of model they wish to run in a Models table 510. The Models table 510 includes the previously described name fields: Front-end Model 1 (store checkout) 512, a Lane Model 1 (front facing), a Lane Model 2 (Nelson), and a Lane Model 3 (fast track). After choosing the simulation model, a Scenarios table 530 will display the scenario files available for that model. As depicted in FIG. 5, the scenarios table 530 includes a default name field 532. Each simulation model has its own set of input parameter files. The User may then select the input parameter file the User wants to work with (i.e., edit, delete, print or run). To select a model or scenario, the User clicks in the models 512, 514, 516, 518 or the scenario name field 532 or on the small rectangle area to the left of these fields 522, 524, 526, 528 and 542, respectively.

FIG. 5 shows the selection of the Front-end Model 1 (store checkout 512) and the Default Scenario 532. The User does not have to select a scenario before selecting a Create Scenarios button 550. The User will have the opportunity to select a scenario from which to create a new scenario on a Create Parameter File form 600 discussed below. The User can select an Edit Scenarios button 560, a Delete Scenarios button 565, a Return to Main Menu button 570, a Print Scenario button 575, a Rub Simulation button 580, and a Check Box 585. If the User wants to run a simulation model with animation, check (i.e., click the left button on your mouse while positioned over the Check Box 585) the Animation Box before selecting the Run Simulation button 580.

When installed on the computer system 100, the LFEM module includes one Default Scenario for each simulation module. The values in the Default Scenarios are from industry composite data collected.

Figure 6:
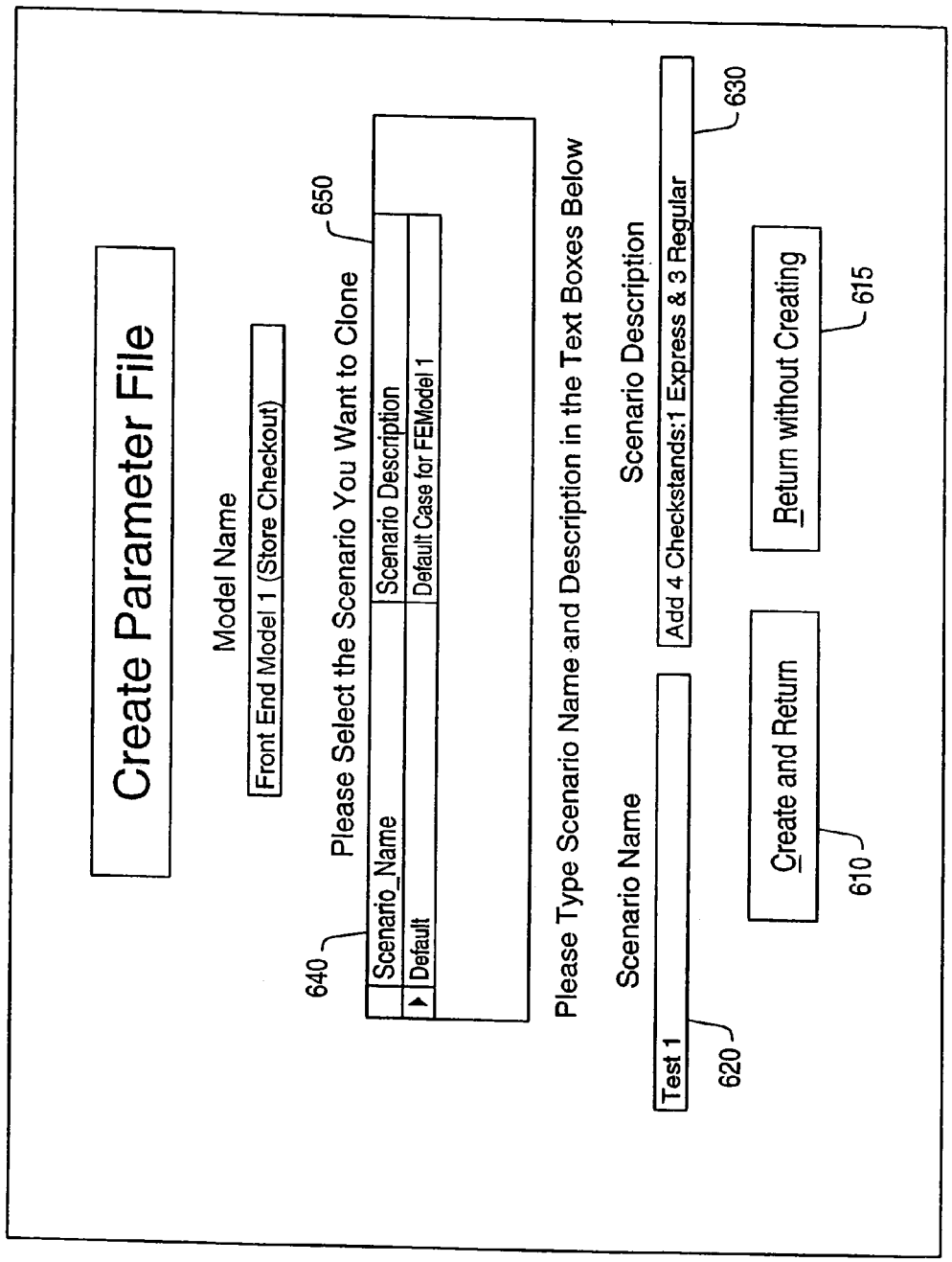
FIG. 6 depicts a create parameter file form.

Appendix A lists Model Default Scenario Parameter Values for a Lane and Front End Model. Appendix B is the Model Output from Default Scenarios for a Lane and Front End Model. The User can create a new scenario file by selecting the Create Scenario button 550 from the Input Module 410. FIG. 6 depicts the Create Parameter File form 600. To create a scenario, the User selects the existing file that the User wants to use to create the new file from in the list of scenario names 640 and scenario descriptions 650 in the center of the Create Parameter File form 600. A scroll bar (not shown) will display to the right of the list when there are more than four scenarios for a model. A name for a new scenario is entered by positioning the cursor in a Scenario Name field 610 and by using the keyboard to type in the name. The LFEM module does not allow duplicate scenario names for a simulation model. The Scenario Name can be up to 50 characters (including blank spaces). The User can also enter an optional Scenario Description in the Scenario Description field 620 of up to 55 characters to further describe the parameter file.

After entering the Scenario Name in a Scenario name field 620 and optional description in a Scenario Description field 630, the User should select a Create and Return button 610 (or press Alt-C) to create the scenario file. The application will prompt the User to confirm their selection before returning to the Input Module form 500. FIG. 6 illustrates the scenario file called Test 1 will be created by this process. The other option one could take from this form is a Return Without Creating button 615 that returns the User to the Input Module form 500 without creating a file. The scenario tables 530 is displayed listing scenario names and scenario descriptions available to be cloned.

Figure 7:
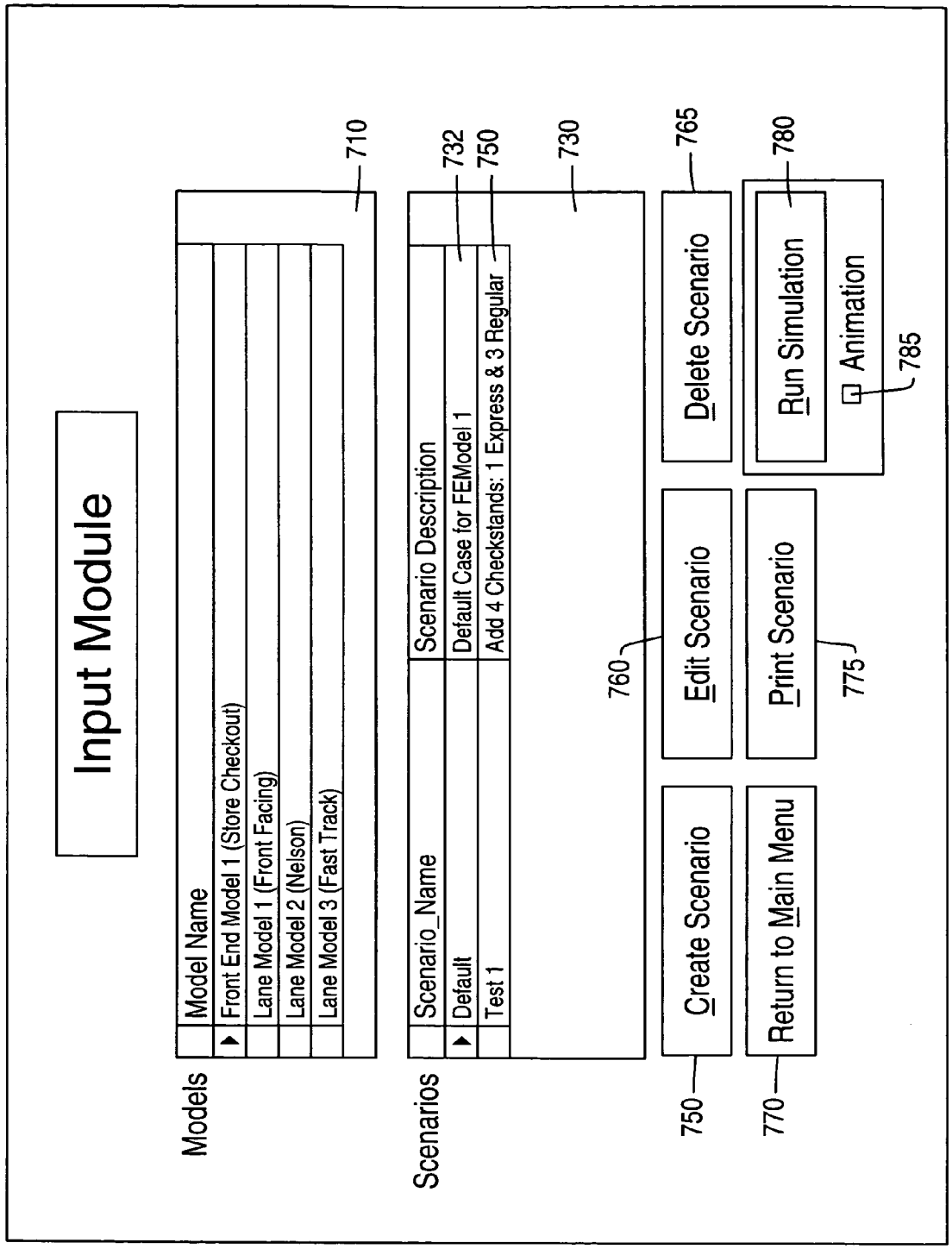
FIG. 7 depicts an input module form after creating scenario case 1.

FIG. 7 depicts the Input Module form after the creation of scenario Test 1 750. Scenario default 732 is also shown. A scroll bar (not shown) will display to the right of the Scenarios list when there are more than eight scenarios for a model.

Each of the simulation models in the LFEM application has its own set of data parameters the User can control to create a scenario. A model's Data Input Dictionary (DID) defines the model's input parameters and their properties, i.e., parameter values, ranges, and what each parameter controls in a model scenario. The User can view or print a model's DID using the Print Scenario button 575 from the Input Module form 500. The DID provides the following information for each parameter.

Parameter The parameter column provides a brief description of how the model uses the input parameter data.

Value The value column displays the current data value assigned to each parameter. If a parameter has the value "ARRAY" it means that it has more than one value assigned to it. For example, the User can enter up to 96 values for the parameter representing the expected number of arrivals per hour in 15-minute time intervals for a 24-hour day in the Front-end model. Parameters of this type are edited using an additional edit form.

Range The range column defines the range of values and the units for the parameter.

Description The description column provides a more detailed description of the parameter and its use in the model.

The following table shows the current (or original) number of parameters and values under the control of the User for each of the LFEM models.

| Simulation Model | Number of Parameters | Number of Values |
| --- | --- | --- |
| Front-end model 1 - Store Checkout | 141 | 566 |
| LaneM1 - Front Facing | 99 | 99 |
| LaneM2 - Nelson | 101 | 101 |
| LaneM3 - Fast-Track | 113 | 113 |

The parameters for each model are divided into eight categories to make them easier to learn and easier to change their values. The eight categories are as follows.

1. Configuration
2. Customer Demand
3. Schedules (for FEM1) or Transaction Pre-Itemization (for all 2-lane models)
4. Transaction Itemization
5. Transaction Finalization
6. Transaction Bagging
7. Transaction Intervention
8. Model Parameters The Configuration category contains parameters that define the length and resources in a scenario, e.g., the number and type of checkstands (FEM1), belt sizes (2-Lane models), etc. The length of a scenario for any of the models can be up to 24 hours. Although, the DID provides definitions for all the parameters in a model, there are requirements for several of the Configuration parameters that are important to understand. The FEM1 requires at least one regular checkstand be open for the entire scenario. This means the User must specify a value of at least one in the "Number of regular lanes" parameter and at least one for each time interval on the "Cashier schedule for regular lanes" parameter between the "Start time" and "End time" parameters. There is a similar requirement for fast-track lanes if the User enters a non-zero value for the "Probability of a fast-track customer".

The Customer Demand category has parameters that control the workload on the front-end or lane, such as number of customer arrivals, customer basket sizes, etc. The FEM1 module uses a random sampling process (nonhomogeneous Poisson arrival process) to generate the arrival times and another random sampling process to generate the customer's basket size, tender type, and if they are a fast-track customer. The User controls how many customers arrive and their basket sizes by two non-scalar parameters with values that can vary by time of day. The 2-Lane models allow the User to represent workload in two ways: Unlimited Arrivals and Limited Arrival method (see 2-Lane Model Logic section). The User selects between these methods by setting the "Unlimited arrivals option identifier" parameter to 1 (Unlimited Arrivals) or to 0 (Limited Arrivals). Setting this parameter to 1 causes the models to ignore the parameter values in "Constant inter-arrival option identifier" and "Customer arrival rate". Otherwise, the User needs to enter values in these two parameters for the models to generate customer arrival times.

Parameters in the Schedules category for the FEM1 allow the User to enter cashier (by lane type), bagger, and super helper schedules in 30-minute intervals during a scenario. There are also parameters that control the number of overflow lane personnel and the number of super helpers dedicated for intervention requests.

The third category for the 2-Lane models contains parameters that control the Pre-Itemization activities for a transaction. There are no schedules to enter for lane models.

The Transaction Itemization parameters are scalar parameters for both sets of models, so the User can edit their values directly on the Edit Parameter File form. The primary difference is the 2-Lane models have more parameters and provide greater control over the transaction itemization process than does the Front-end model.

For most transaction time events, the User needs to enter two parameter values. In the LFEM module, the first parameter specifies the mean and the second parameter specifies the standard deviation of the event time distribution. For example, in the default scenarios for LaneM2, the mean and standard deviation for scan time per item are 2.5 and 1.0 seconds, respectively.

The Transaction Finalization parameters are also scalar parameters. Again, there are more parameters for this category in the 2-Lane models than the Front-end model. For all models, the User enters tender time parameters by tender type. Tender time parameters are also entered by lane number for 2-Lane models and by lane type for the Front-end model.

The Transaction Bagging category contains parameters that govern how long it takes to bag items and which resources (customer, cashier, bagger, or super helper) are available to perform this operation.

Transaction Intervention category contains parameters that control this component of the customer checkout process. The Front-end model and LaneM3 are the only models that use this parameter category.

The remaining category is the Model Parameters category. There are only three parameters in this category for each model. They are "Number of replications", "Stream number identifier", and "Check input option identifier". In most applications, the User will not need to change the values of these parameters. If the User wishes more precision in the model's estimates of the mean performance measures, the User should increase the value of "Number of replications". It is recommend that the User does not reduce the value of this parameter below 30 when using the model results to make inferences about the checkstand or front-end design. Changing the value of the "Stream number identifier" will run the scenario using a different sequence of random numbers. Finally, the "Check input option identifier" specifies whether or not the parameter values for a scenario file are written to a file, e.g. c:\Arena Viewer\SSL\SSLChk.out or c:\Arena Viewer\LFEM\LFEMChk.out. The purpose of this file is to verify input parameter values for technical support.

Figure 8:
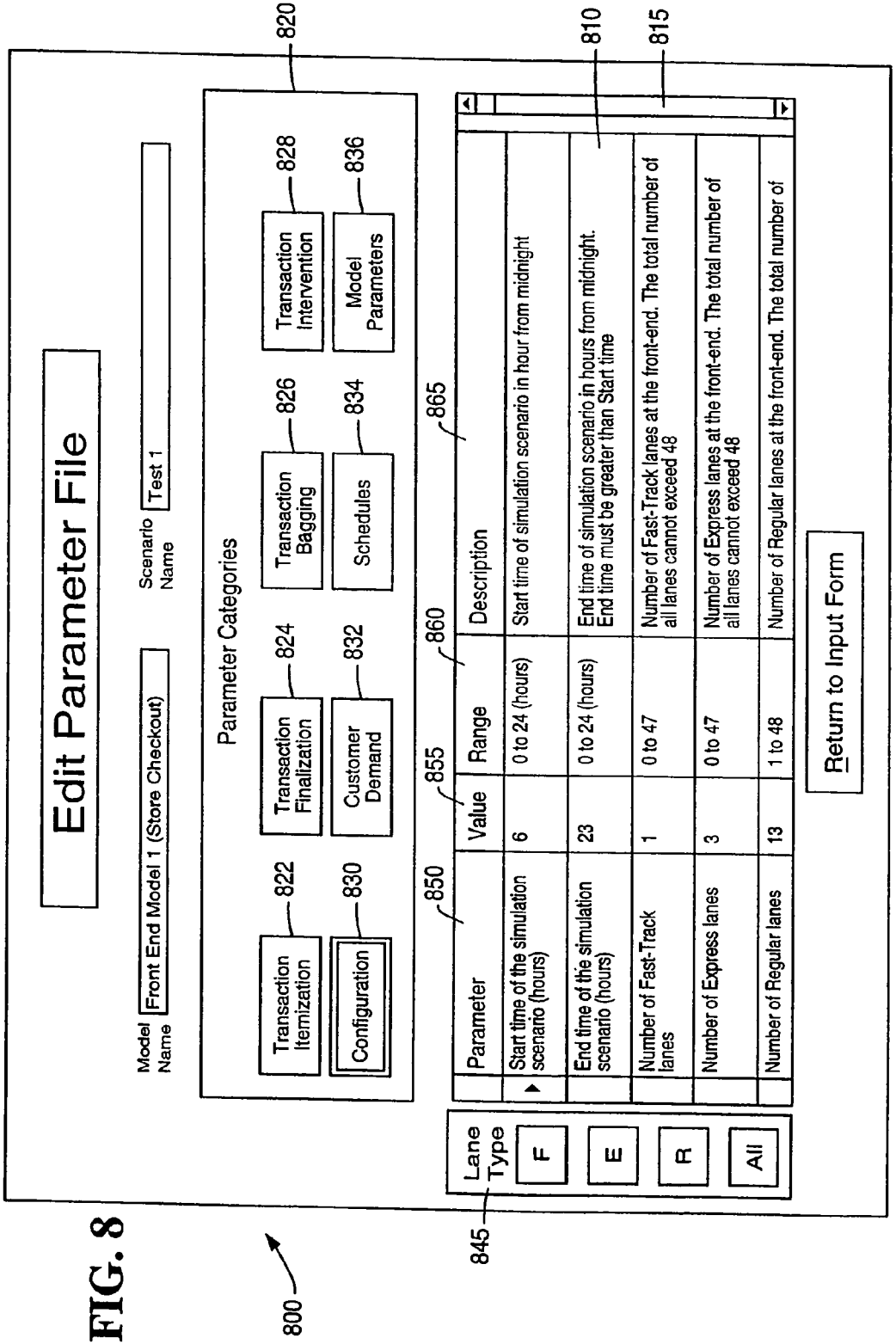
FIG. 8 depicts an edit parameter file form.

To modify the parameter values for a scenario, the User should select the Edit Scenario button 560 on the Input Module form 500. FIG. 8 depicts an Edit Parameter File form 800 for the FEM1. The Edit Parameter File form allows the User to view or change the values for each parameter in the scenario files created by the User. Recall the User cannot change the values in a model's Default scenario.

Each time the User enters this form, an edit table displays the full set of parameters in the DID. The edit table includes a Parameter column 850, a Value column 855, a Range column 860 and a description column 865. The User can use the scroll bar 815 to the right of edit table 810 to browse through the full set. Alternatively, the User can view only a subset of the parameters corresponding to a particular category by clicking on a category button in a Parameter Categories section 820. The Parameter Categories are represented by buttons including Transaction Itemization 822, Transaction Finalization 824, Transaction Bagging 826, Transaction Intervention 828, Configuration 830, Customer demand 832, Schedules 834 and Model Parameters 836. To view a subset of parameters that correspond to a lane type (F-Fast-Track, E-Express, R-Regular, and All—All Parameters), click on a button in the Lane Type section 845.

FIG. 9 depicts the Edit Parameter File form 900 for the 2-lane models. The Parameter Categories buttons are slightly different for the 2-lane models. The 2-lane model includes Parameter Categories represented by buttons for Transaction Pre-Itemization 922, Transaction Itemization 924, Transaction Finalization 926, Bagging 928, Configuration 930, Customer Demand 932, Model Parameters 934 and Intervention 936. The Intervention Parameter Category button 936 is only enabled for LaneM3—East-track checkstand model. Also, the Edit Parameter File form 900 for the 2-lane models replaces the Lane Type section with Lane # section 945 and it provides options 1, 2 and ALL corresponding to Lane 1, Lane 2, and All parameters, respectively.

There are two approaches for editing a value of a parameter in parameter list 950 parameter's value(s) depending on whether the parameter has a single value (called a scalar parameter) or has multiple values (called a non-scalar parameter or an ARRAY). To edit the value for a scalar parameter, the User selects the cell in the Value column 955 of the edit table 910 for the parameter that the User wants to change and enters the new value. For example, to change the scenario Start Time parameter from 6 am to 7:30 am in FIG. 8, the User selects the cell containing the value of 6 and types in 7.5. Note the Start Time and End Time parameters are in units of hours from 12 midnight. When changing values, the User should make sure the new value is within the allowable range displayed in the Range column 960 for the parameter. If the User enters a value outside the allowable range, the LFEM module will remind the User with a warning message. To edit the values for a non-scalar parameter, the User must click on a small rectangle icon 960 just to the left of the Parameter field. Other Parameter rows have similar rectangular icons 962, 964, 966 as depicted in FIG. 9. This action will evoke a new form that will allow the User to edit each value for the parameter. A non-scalar parameter will have the word "Array" in the Value column.

In the LFEM module, only the store front-end model has non-scalar parameters. The following is a list of the seven non-scalar parameters for FEM 1.

1. Expected number of arrivals per hour in 15-minute intervals
2. Average customer basket size in 15-minute intervals
3. Schedule of cashiers to operate Regular lanes
4. Schedule of cashiers to operate Express lanes
5. Schedule of cashiers to operate Fast-Track lanes
6. Schedule of super helpers to assist lanes
7. Schedule of baggers or courtesy clerks After the User clicks on the rectangle icon adjacent to the left side of the Parameter column, the LFEM module 960 will open a new form that allows the User to modify the parameter's values. The next three sections describe the edit forms for these non-scalar parameters.

FIG. 10 displays the form for editing the "expected number of arrivals per hour in 15-minute intervals". The Arrival Rate Schedule form allows the User to change the values for the parameter that describes the rate at which customers arrive to the front-end. The model uses these rates to randomly generate customer arrival times throughout the simulation scenario.

An edit table in the Arrival Rate Schedule form 1000 lists values from 12:01 am to 12:00 pm in 15-minute intervals in a Time Interval column 1040. To change a value, the User scrolls to the time interval using a scroll bar 1015 that the User wants to edit, selects the corresponding cell in a Number of Arrivals column 1050, and enters the new value. The units for the values entered into this parameter are number of arrivals per hour in 15 minutes not the number of arrivals in 15 minutes.

The User must understand this important difference to prevent running a scenario with a different customer arrival pattern then the User intended to run. For example, if the User wants to represent 100 customers per hour from 9:00 to 9:30 am, and 150 customers per hour from 9:30 to 10:00 am, then the entries should be:

| | |
|---|---|
| 9:01–9:15 am | 100 |
| 9:16–9:30 am | 100 |
| 9:31–9:45 am | 150 |
| 9:46–10:00 am | 150 |

The model ignores values entered in the Number of Arrivals column 1050 before and after the time intervals specified by the Start Time and End Time parameters, respectively.

There are two options from this form, either a Print Schedule button 1060 or Return to Edit form 1065. The Print Schedule button 1060 creates a report containing the arrival rate schedule and displays it on the screen. The User can then send the report to a printer or save it to a file in a variety of data formats.

Figure 11:
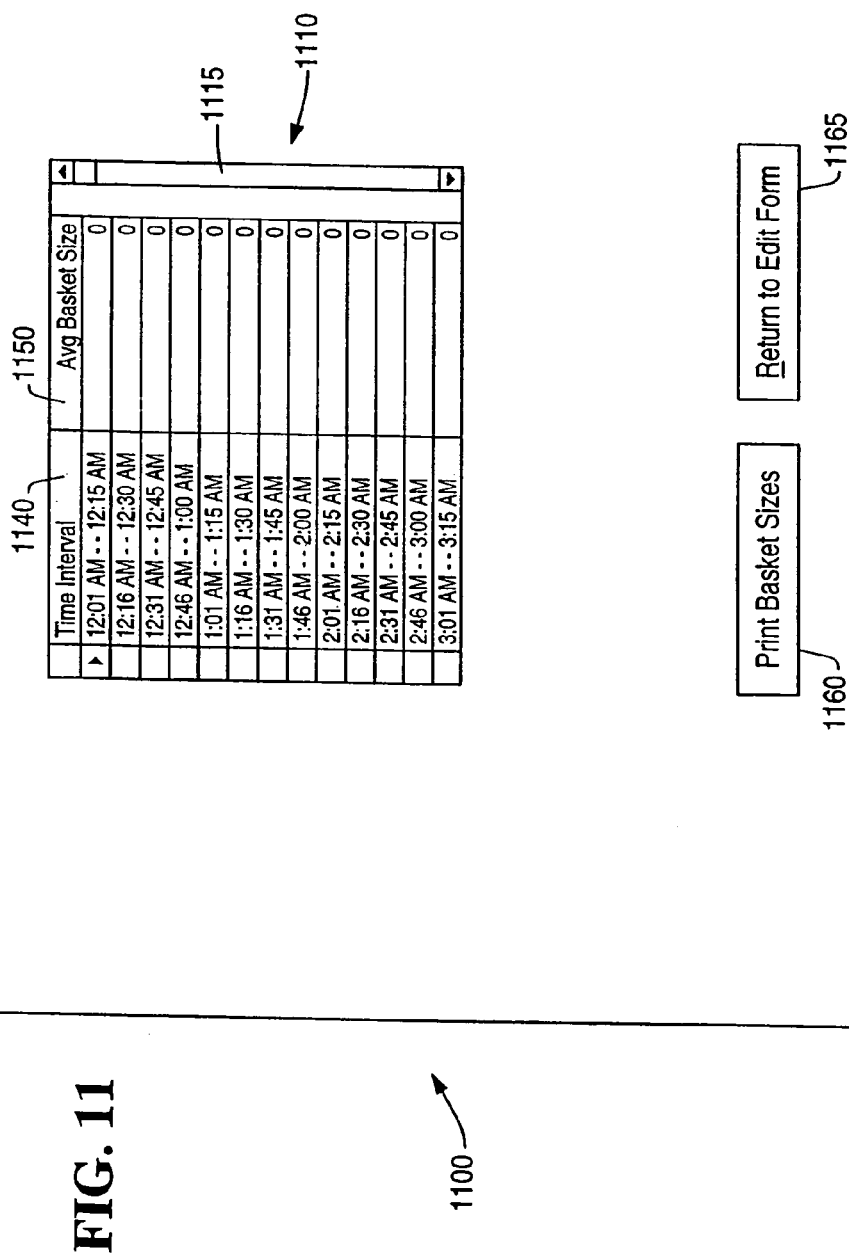
FIG. 11 depicts an average basket size file form.

An Average Basket Sizes form 1100 depicted in FIG. 11 allows the User to enter values for the parameter that specifies the average size of a customer's basket (i.e., number of items a customer purchases) during a scenario. The model uses these values to randomly generate a basket size for each customer when they arrive at the store front-end. A customer's basket size will never be less than 1 or greater than 200 items. FIG. 11 shows the edit form for the "average customer basket size in 15-minute intervals" parameter.

Similar to the Arrival Rate Schedule form 1000, the edit table in this form list values from 12:01 a.m. to 12:00 p.m. in 15-minute intervals in Time Interval column 1140. to change a value, the User scrolls to the time interval the User wants to edit using a scroll bar 1115, selects the corresponding cell in an Avg Basket Size column 1150, and enter the new value. The units for the values entered into this parameter are number of items. The model ignores values entered in the Avg Basket Size column 1150 before and after the time intervals indicated by the Start Time and End Time parameters, respectively.

There are two options from this form, either a Print Schedule button 1160 or a Return to Edit form button 1165. The Print Schedule button 1160 creates a report containing the average basket sizes by time of day and displays it on the screen. The User can then send the report to a printer or save it to a file in a variety of data formats.

Figure 12:
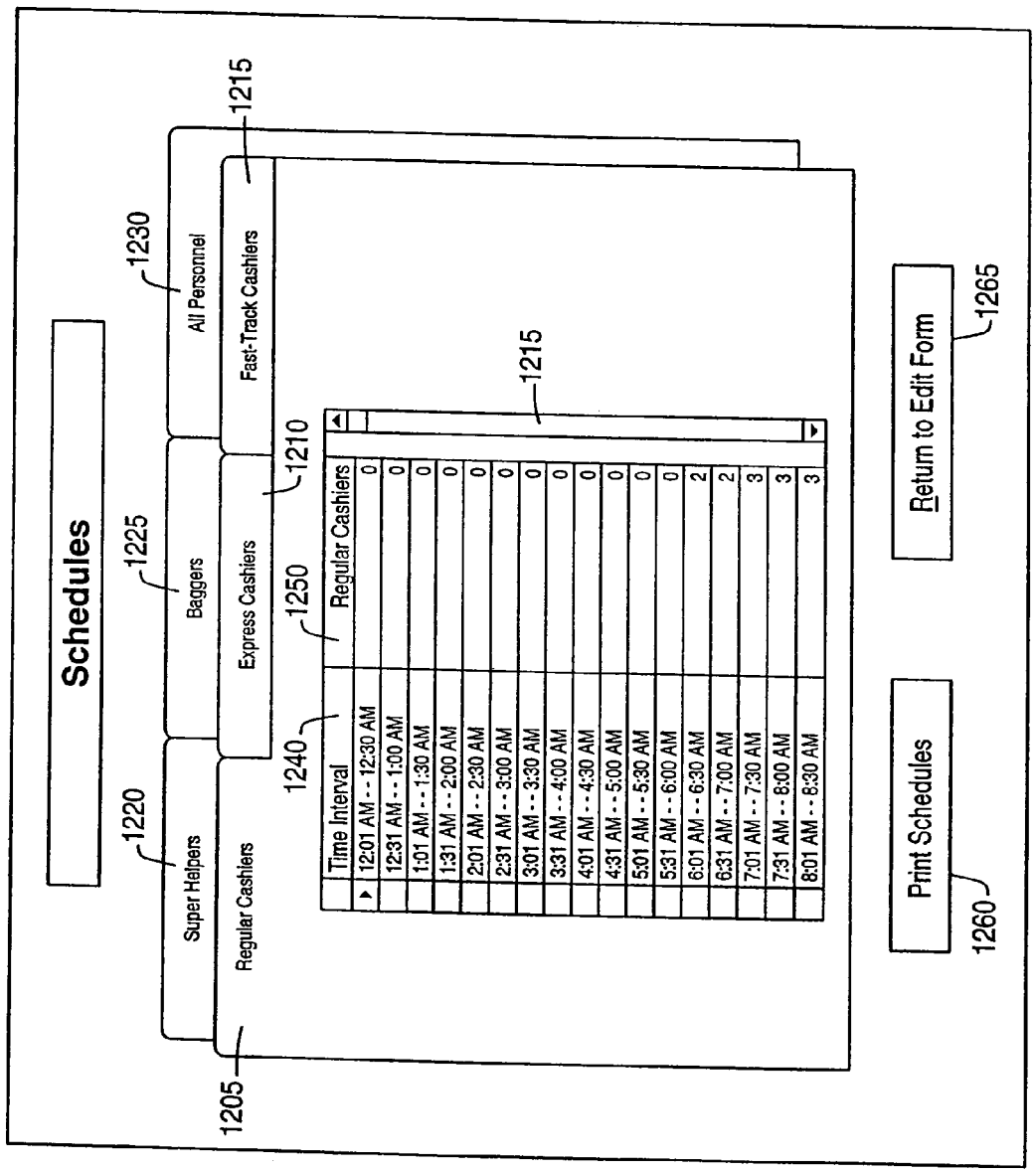
FIG. 12 depicts a schedule file form.

A schedules form 1200 depicted in FIG. 12 allows the User to enter the number of front-end personnel available by labor type in 30-minute time intervals for a scenario. The schedule form 1200 includes a scroll bar 1215, a Time Interval column 1240 and a Personnel column 1250 (depicted as regular cashiers in FIG. 12). There are three labor types (Superhelpers 1220, Baggers 1225, and Cashiers) in the front-end model the User can schedule. Furthermore, cashiers are also scheduled by lane type: Fast-Track 1215, Express 1210 and Regular 1205. The User can change the schedule by selecting the tab of the labor type they wish to change.

All five of the schedule parameters:
1. Schedule of cashiers to operate Regular lanes,
2. Schedule of cashiers to operate Express lanes,
3. Schedule of cashiers to operate Fast-Track lanes,
4. Schedule of super helpers to assist lanes, and
5. Schedule of baggers or courtesy clerks, in the FEM1 use this form. FIG. 12 illustrates the current active parameter is the "Schedule of cashiers to operate Regular lanes". After the User enters this form 1200 from the Edit Parameter File form for any of the five parameters, they can edit the values for the other parameters by selecting the corresponding parameter tab. The tab labeled All Personnel 1230 displays an edit table for all five parameters at the same time.

The FEM1 requires that at least one Regular lane cashier (and fast-track cashier if used) be available throughout a scenario; otherwise, the only other requirement is the User should enter only nonnegative integer values. The FEM1 model ignores values entered in the schedules before and after the time intervals indicated by the Start Time and End Time parameters, respectively. Also, the User should not enter a value in a schedule larger than the number of service point locations. For example, if the number of express lanes in a scenario is four, then any entering a value greater than four in the "Schedule of cashiers to operate Express lanes" will result in the same performance as entering a value of four.

After the User finishes editing the values in this form, the User can select one of two options, either Print Schedule button 1260 or a Return to Edit form 1265. The Print Schedule button 1260 creates a report containing the schedules for all five parameters by time of day and displays it on the screen. The User can then send the report to a printer or save it to a file in a variety of data formats.

The User can delete scenario files the User creates by selecting the scenario on the Input Module form and evoking the Delete Scenario option 565. Performing this action will open the Delete Parameter File form depicted in FIG. 13.

Figure 13:
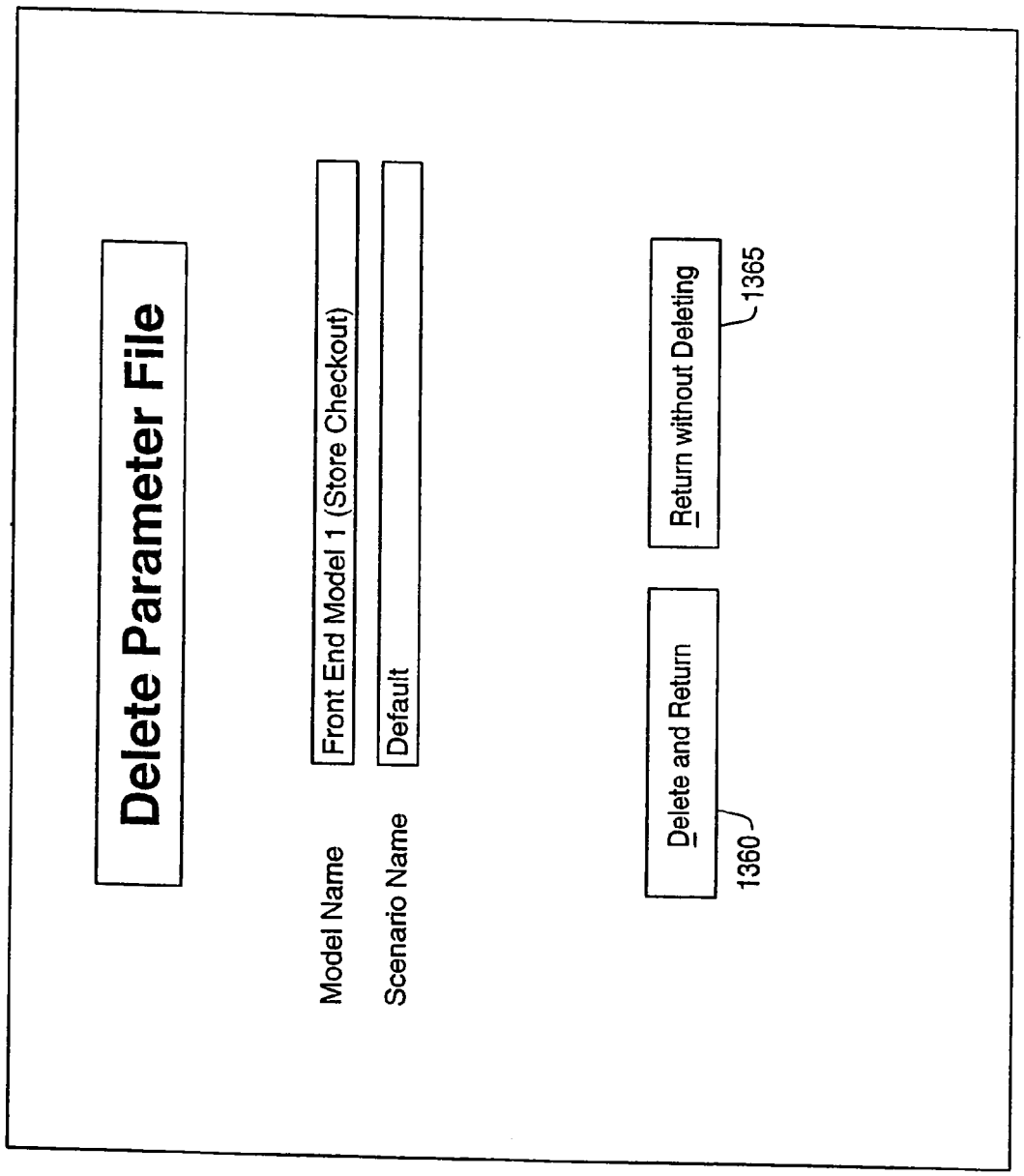
FIG. 13 depicts a delete parameter file form.

There are two options from this form: a Delete and Return button 1360 and a Return Without Deleting button 1365. If the User selects the Delete and Return button 1360, then the LFEM module opens a window which prompts the User to confirm the request to delete the scenario file. Selecting OK to the confirmation will delete the scenario file and return the User to the Input Module Form 500. Selecting CANCEL on the confirmation will return the User to the Delete Parameter File form 1360 without deleting the file. The Return Without Deleting button 1365 returns the User to the Input Module form 500 without deleting the scenario file. Remember that the User cannot delete a model's Default scenario, so the only option the LFEM will allow you to select in the Delete Parameter File form 1300 depicted in FIG. 13 is Return Without Deleting.

The User can display a model's DID by selecting the Print Scenario button 575 from the Input Module form 500. FIG. 14 depicts a first page of the DID for the front-end model. The User can use the control buttons at the top of this window to:

1. Page through the report,
2. Print the report to the default Windows 95™ printer, or
3. Save the report to a disk file in the name of your choice and in a variety of data formats.

After the User finishes with the DID report, you can close the report window as you would with any other Windows 95™ window, e.g., click on the "X" icon in the upper right hand corner.

The Print Scenario button 575 from the Input Module 500 will create and display a report of only a model's scalar parameters and their values. To generate a report containing the values for non-scalar parameters, the User needs to select the print option button on the non-scalar parameter edit form. For example, selecting the Print Basket Sizes 1160 from the Average Basket Sizes edit form 1100 will print the values for this parameter.

The User can run a simulation model from the Input Module form 500 or the Run Simulation Module form 1500 discussed below. There is no difference between running a model from either location. In each case, the User selects the model and scenario the User wants to run and then the User starts the simulation by selecting the Run Simulation button 1580. Checking the Animation box 1585 below the Run Simulation button 1580 will turn on the animation.

Figure 15:
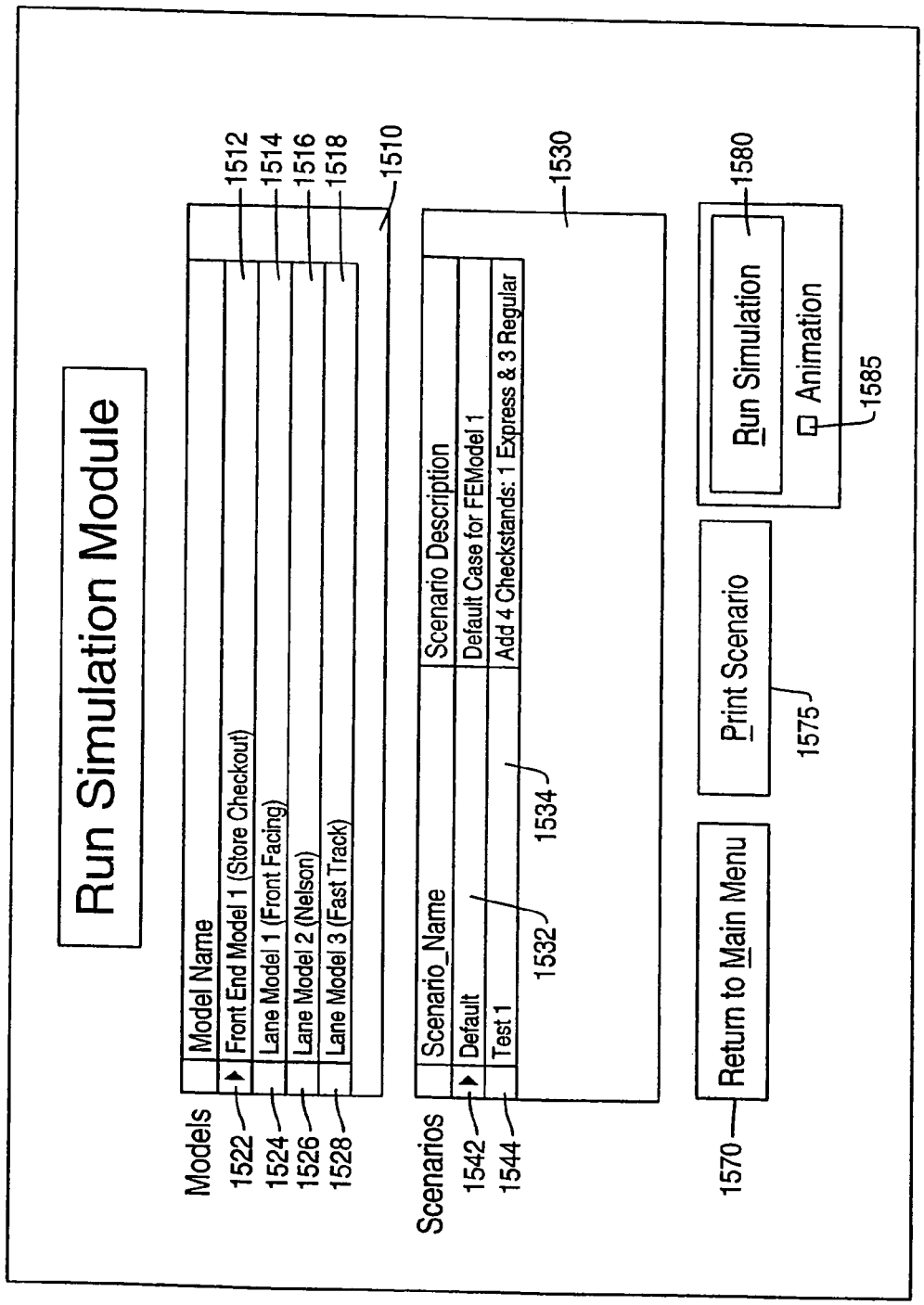
FIG. 15 depicts a run simulation module form.

The User can run existing scenario files from the Run Simulation Module form depicted in FIG. 15. A models table 1510 includes the following models: Front End Model 1 (Store Checkout) 1512, Lane Model 1 (Front Facing) 1514, Lane Model 2 (Nelson) 1516 and Lane Model 3 (Fast Track) 1518 activated by rectangular boxes 1522, 1524, 1526, 1528, respectively. A scenarios table 1530 includes a Default scenario 1532 and a Test 1 scenario 1534 activated by rectangular boxes 1542, 1544, respectively.

There are three options from this form: a Return to Main Menu button 1570, a Print Scenario button 1575 and a Run Simulation button 1580. The first button 1570 will return the User to the main menu. The Print Scenario button 1575 will generate a report containing a model's DID and display it on the screen. FIG. 15 illustrates the DID report for the FEM1 model. The User can then send the report to a printer, save the report to a disk file, or close the report and return to the Run Simulation Model form. The Run Simulation button 1580 will start running the model and scenario selected in the Models 1510 and Scenarios 1530 tables of this form.

Figure 16:
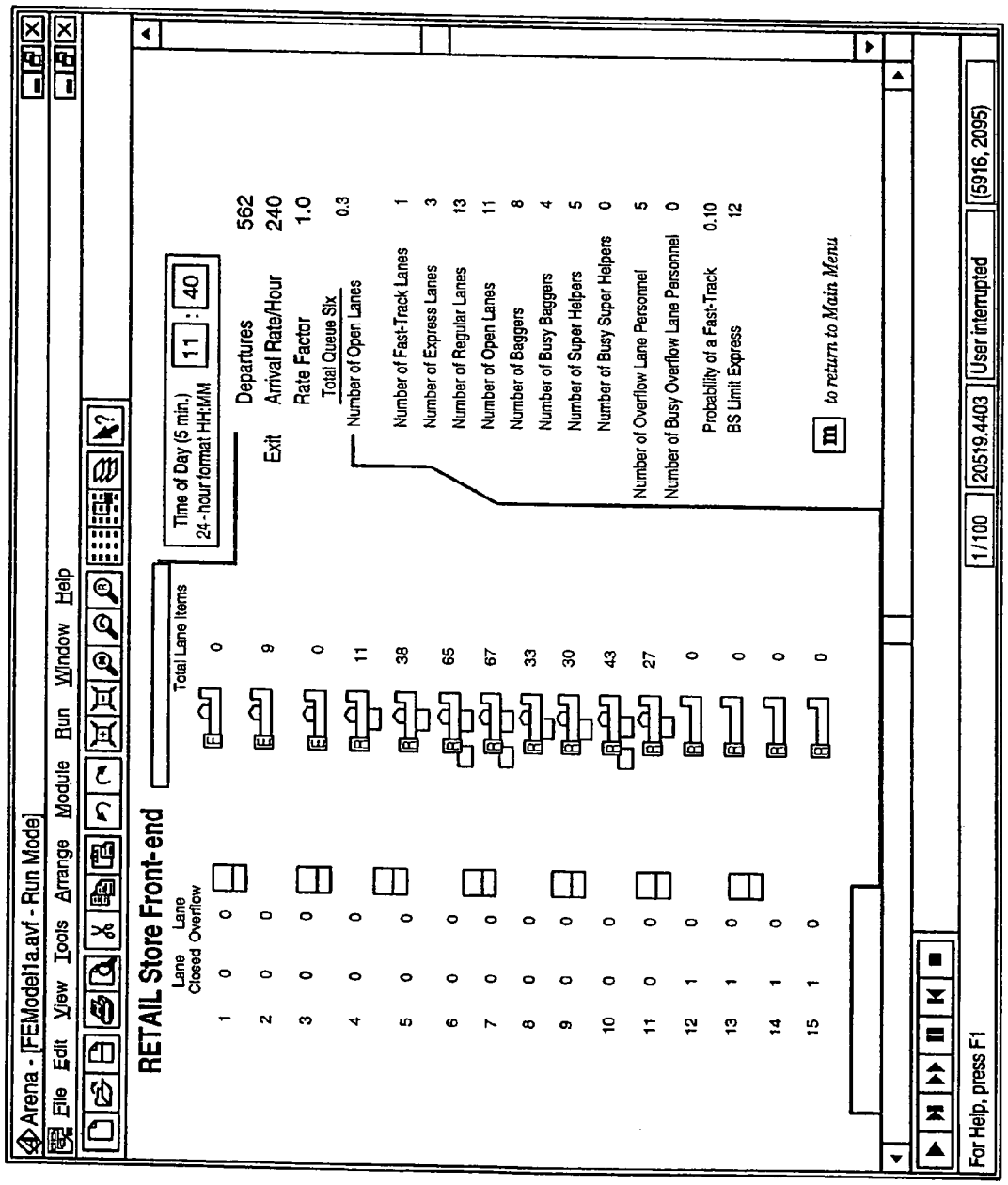
FIG. 16 depicts a retail store front-end in animation mode.

To run a model with the animation on, the User checks the animation box 1585 before selecting the Run Simulation button 1580. This action launches the animation of the simulation scenario selected. The current version of the LFEM application using an application from System Modeling Corporation called Arena Viewer™ to run the simulation scenario and display the corresponding animation. FIG. 16 illustrates the animation overview screen of the FEM1. In animation mode, the User controls the model execution using either the file menu options or the button menu bar.

In animation mode, the model scenario will start running, i.e., Go, automatically. To pause the model, the User needs to click on the Pause button, i.e., the button with two vertical lines, "||". The User may want to pause a model, for example, to describe the scenario to their audience or check to make sure the scenario status variables displayed on the screen appear correct. When the User is ready to start the model again, the User selects the Go button, i.e., the right arrow button, "u". To end the model, the user needs to click on the Pause button, "||", and then the End button, i.e., the button with a rectangle. The User can restart the model after a Pause or begin it again after the User selects the Pause and End button, by selecting the Go button. When the User finishes demonstrating the model or is confident the model scenario appears correct, the User needs to End the simulation scenario, close the Arena Viewer™ application, and return to the Run Simulation Module form. The simplest method to close the Arena Viewer™ application is to click on the X icon in the upper right hand corner of the screen.

One important reason to first run a model scenario in animation mode is the simulation models perform additional checks on whether the parameter values for a scenario are feasible or not. If an error is found, the model will stop prematurely (i.e., before the model completes the specified number of replications). If the model stops, Arena Viewer™ will display a window asking if the User would like to see the model's results. Answer Yes to this prompt and a window displaying a text file will display on the screen. The first line of this text file will contain an error message that indicates why the model stopped. The User should take note of the error message, close the text file window, close the Arena Viewer™, and go into the Input Module and make the correction to the input scenario indicated by the error message. If the User is in animation mode and the model scenario runs to completion, then the User should click the No button on the prompt to see the model's results, close the Arena Viewer™ application, and go into the Output Module to see the results.

Figure 17:
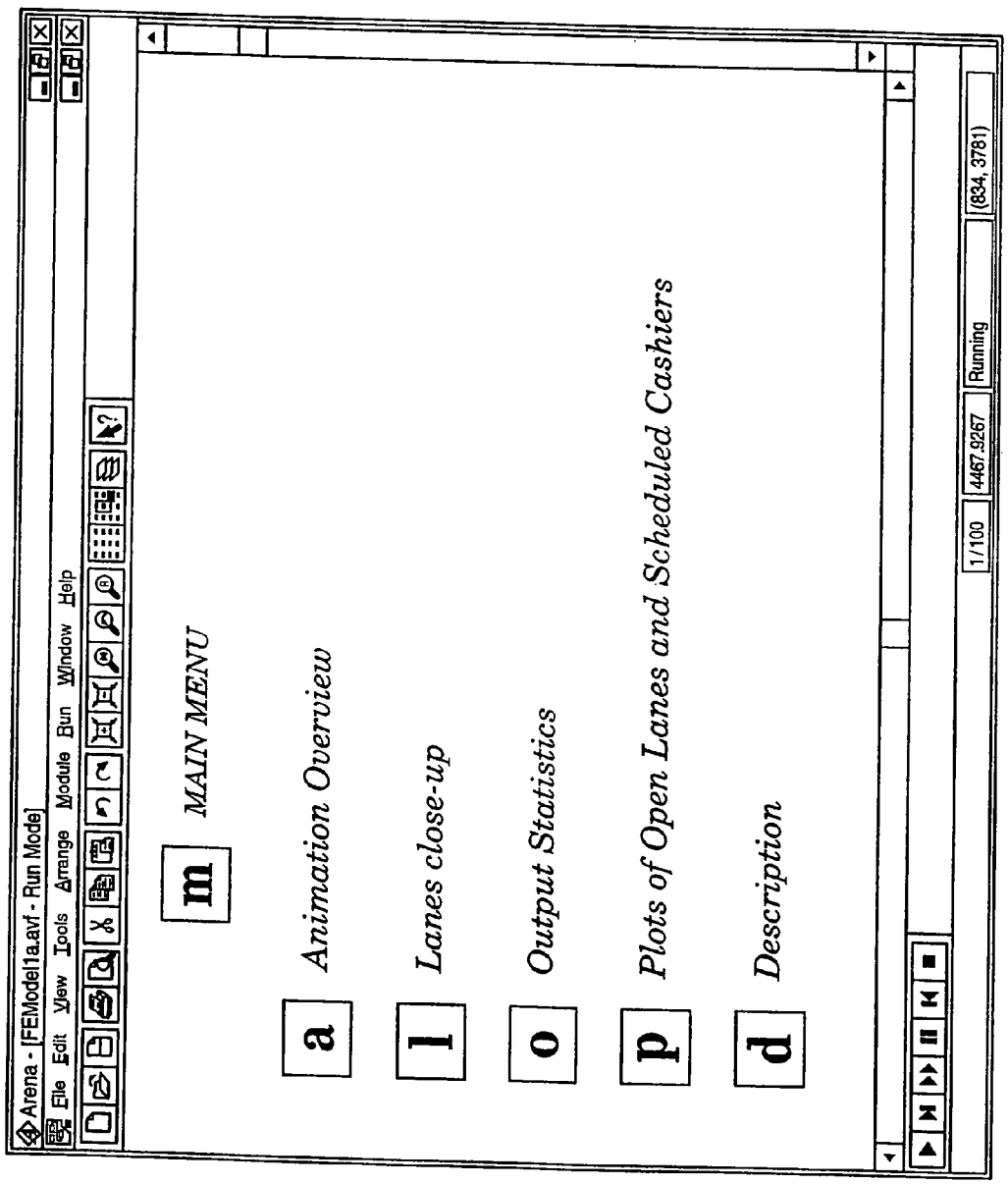
FIG. 17 depicts a main menu.

The present invention also sets up several screen views in each of the simulation models to help the User better understand and communicate the model's results. One can display these screen views only when a model is run in animation mode. Arena Viewer™ lists the screen views for each model when the User presses the "m" key (lower case) on the keyboard. FIG. 17 illustrates the screen views available in the Front-end Model.

Figure 18:
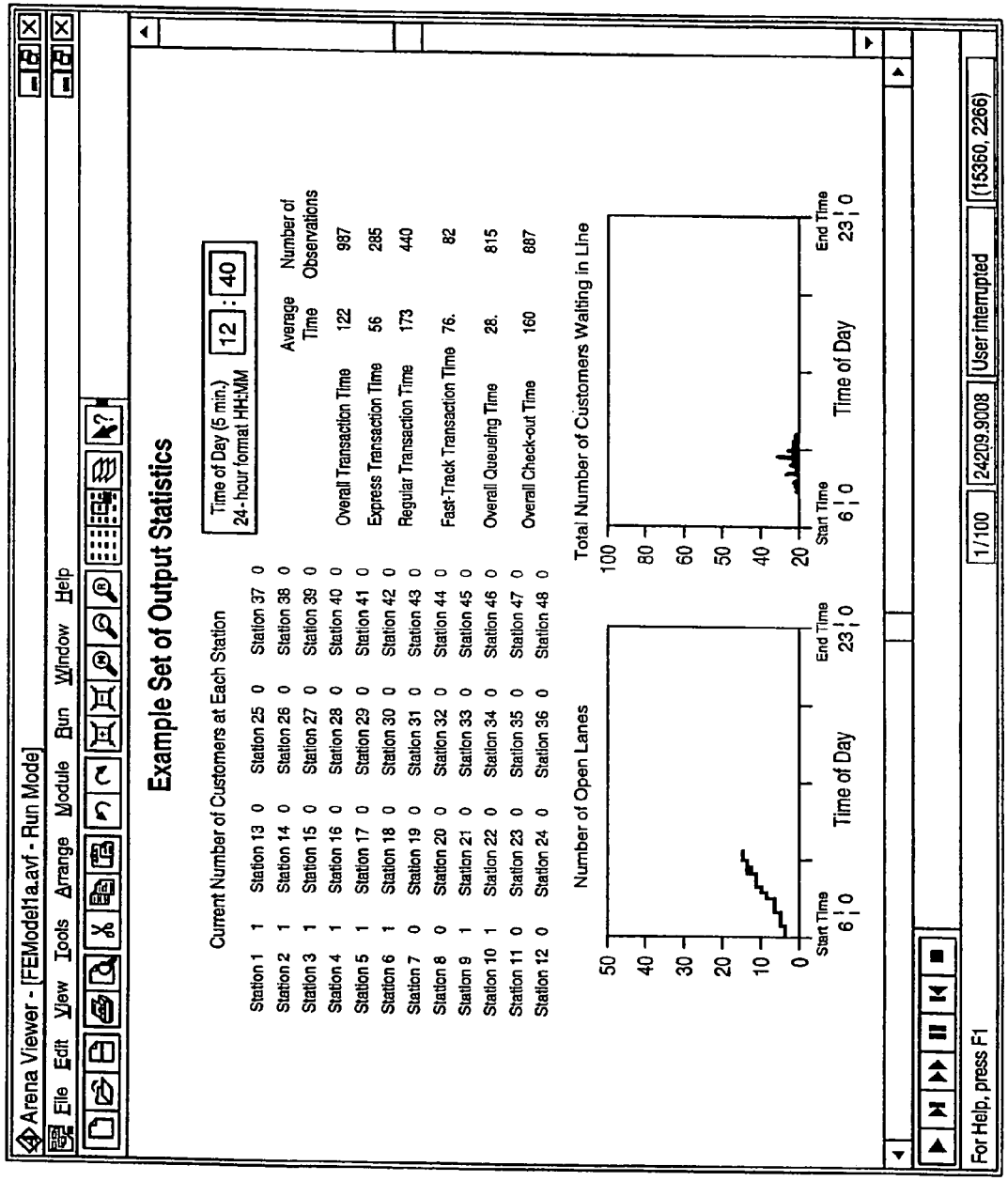
FIG. 18 depicts an example set of output statistics for the front-end model.
Figure 19:
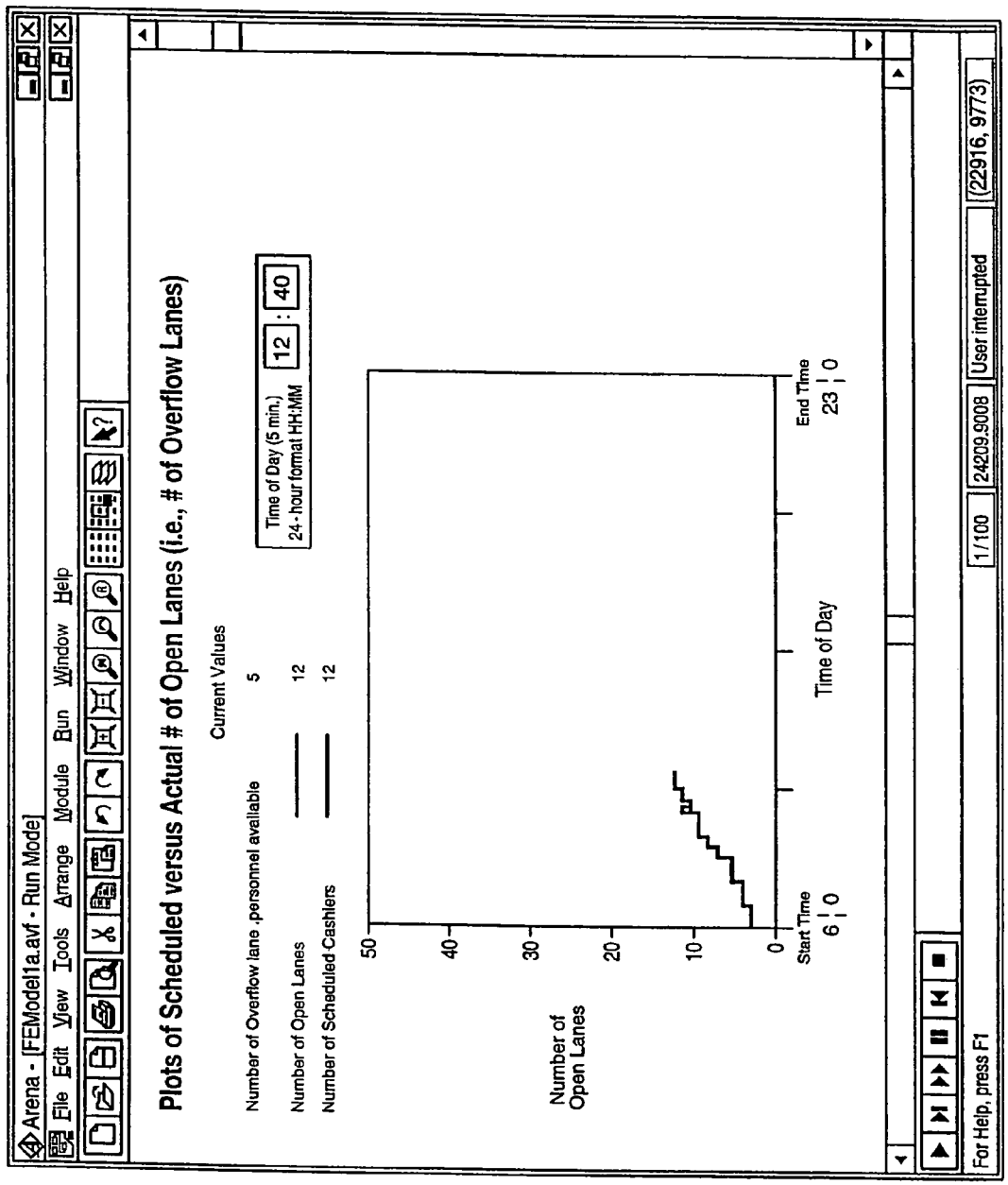
FIG. 19 depicts a graph of schedule versus actual number of open lanes.
Figure 20:
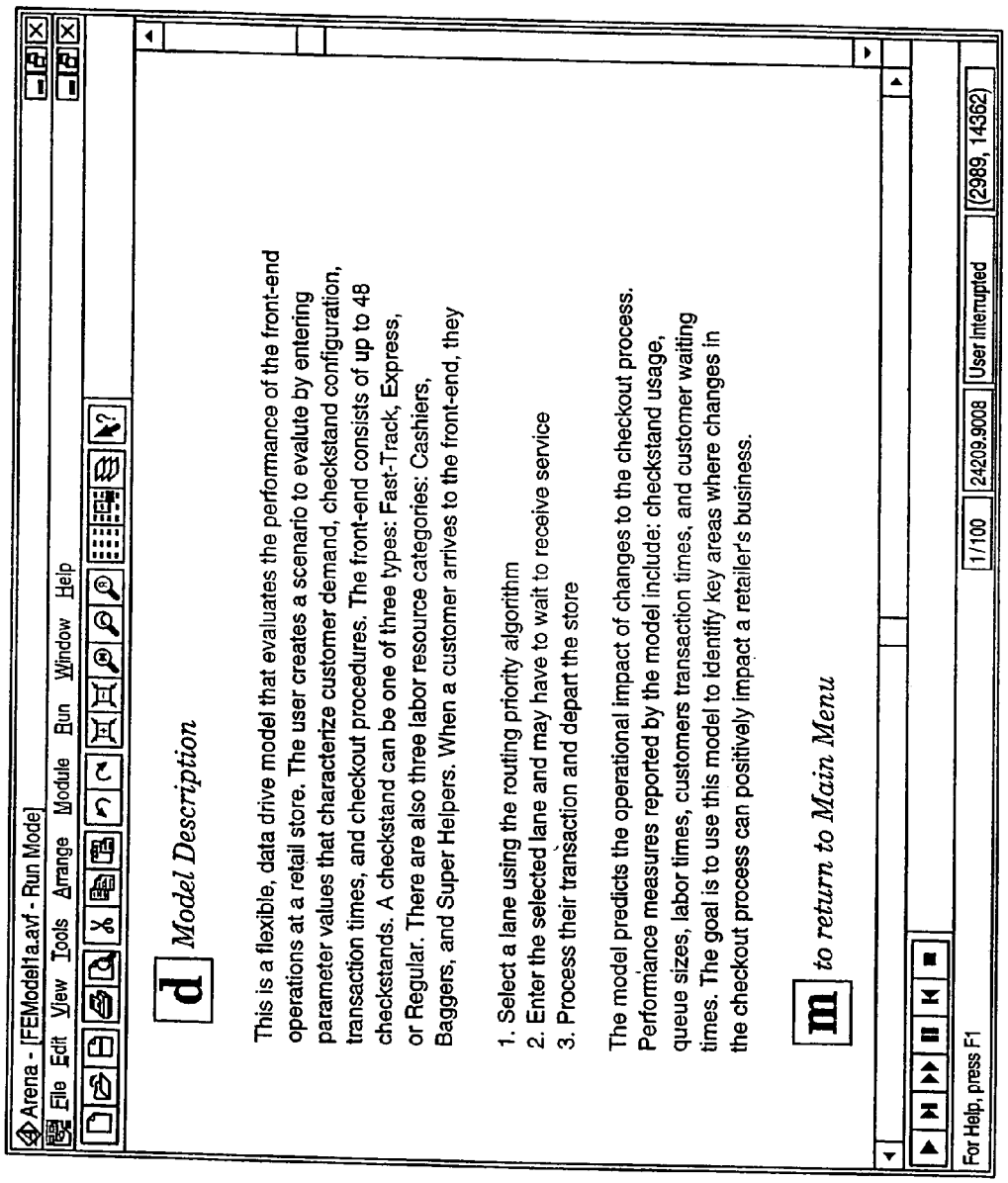
FIG. 20 is a model description.

The User can switch between screen views by entering the lower case letter corresponding to the screen view title. For example, pressing the "a" key switches the view back to the animation overview screen displayed in FIG. 16. The "l" key displays a close-up view of the lanes in FIG. 16. FIG. 18 depicts the screen view displayed when pressing "o". This screen shows the current value of some of the output performance measures reported by the model. FIG. 19 depicts a graph with two plots: the number of lanes open and the number of available cashiers. The difference between these two plots is the number of overflow lanes in the scenario and is an indication of how well you have scheduled your cashiers. Finally, FIG. 20 displays a screen view that gives a summary description of the model.

The screen views for the other three models, LaneM1, LaneM2, and LaneM3, are similar to the views for model FEM1, and are not shown or described herein in detail.

In the analysis mode, when the User is ready to run simulation experiments to analyze the impact of certain design, procedure or technology changes on checkstand or front-end performance, the User should do so with the animation off. When the animation is off, the models execute much faster allowing the User to conduct more statistically sound experiments. The LFEM module can also evaluate many more scenarios in a shorter time period.

Figure 21:
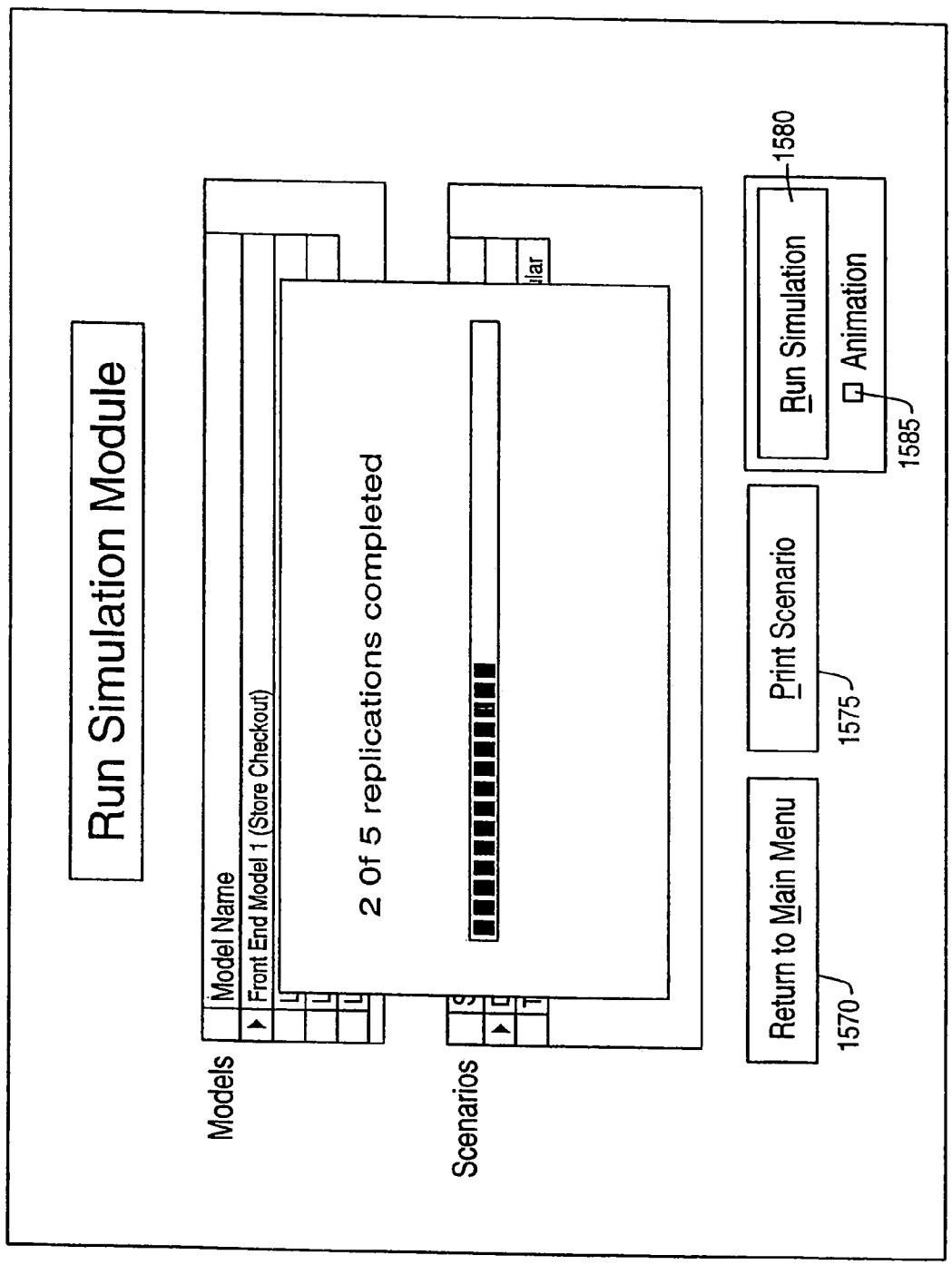
FIG. 21 depicts a screen during which the simulation model is running.

To run a scenario in the analysis mode, simply select the Run Simulation button 1580 on the Run Simulation Module form 1500 with the Animation box 1585 left unchecked. After a slight delay to initialize the model, a window will appear displaying the current number of replications completed out of the total number of replications the User specified in the input parameter "Number of simulation replications". For example, FIG. 21 illustrates the model has processed 2 out of the 5 replications for this scenario.

Figure 22:
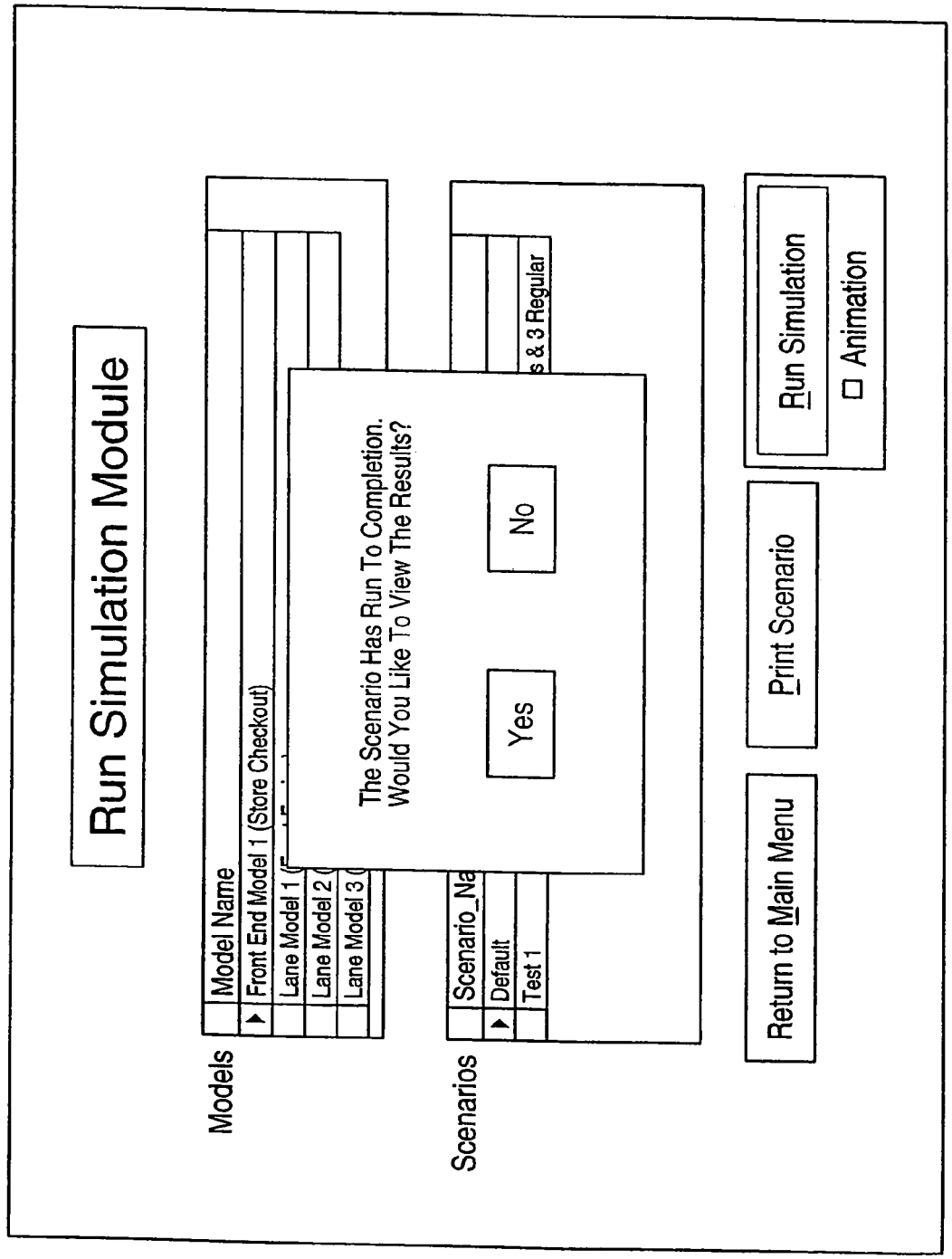
FIG. 22 depicts a screen illustrating that the scenario has run to completion.

As depicted in FIG. 22, when the model completes all the replications, the LFEM module will display a window to ask if you would like to see the results. Selecting "Yes" will cause the LFEM module to display the output Module form 2300. Selecting "No" will cause the LFEM module to display the Run Simulation Module form 1500.

Output Module

Each of the simulation models in the LFEM has its own set of output performance measures. These measures include throughput, transaction times, queue sizes and times, resource utilization, and customer times.

Figure 23:
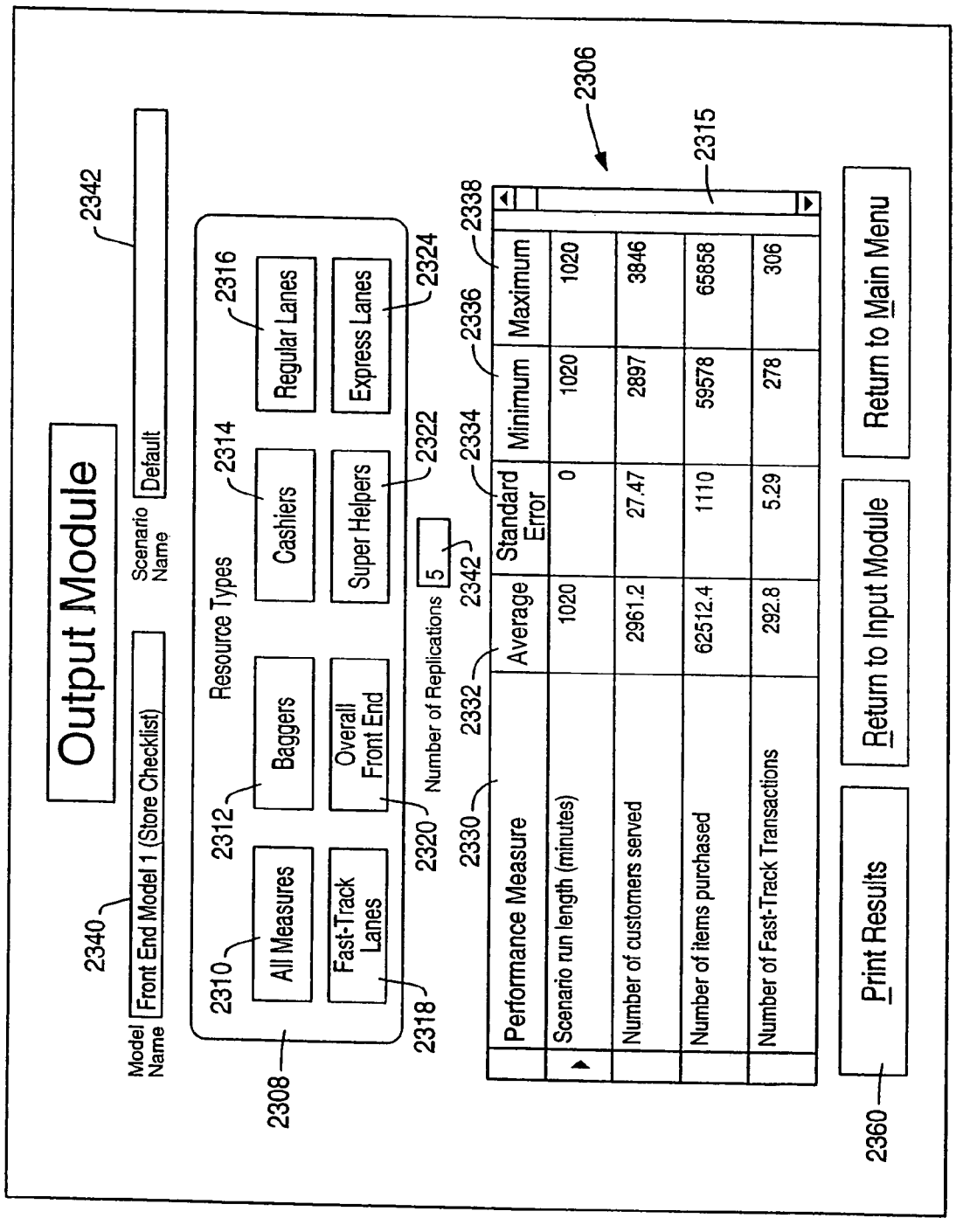
FIG. 23 depicts an output module.
Figure 24:
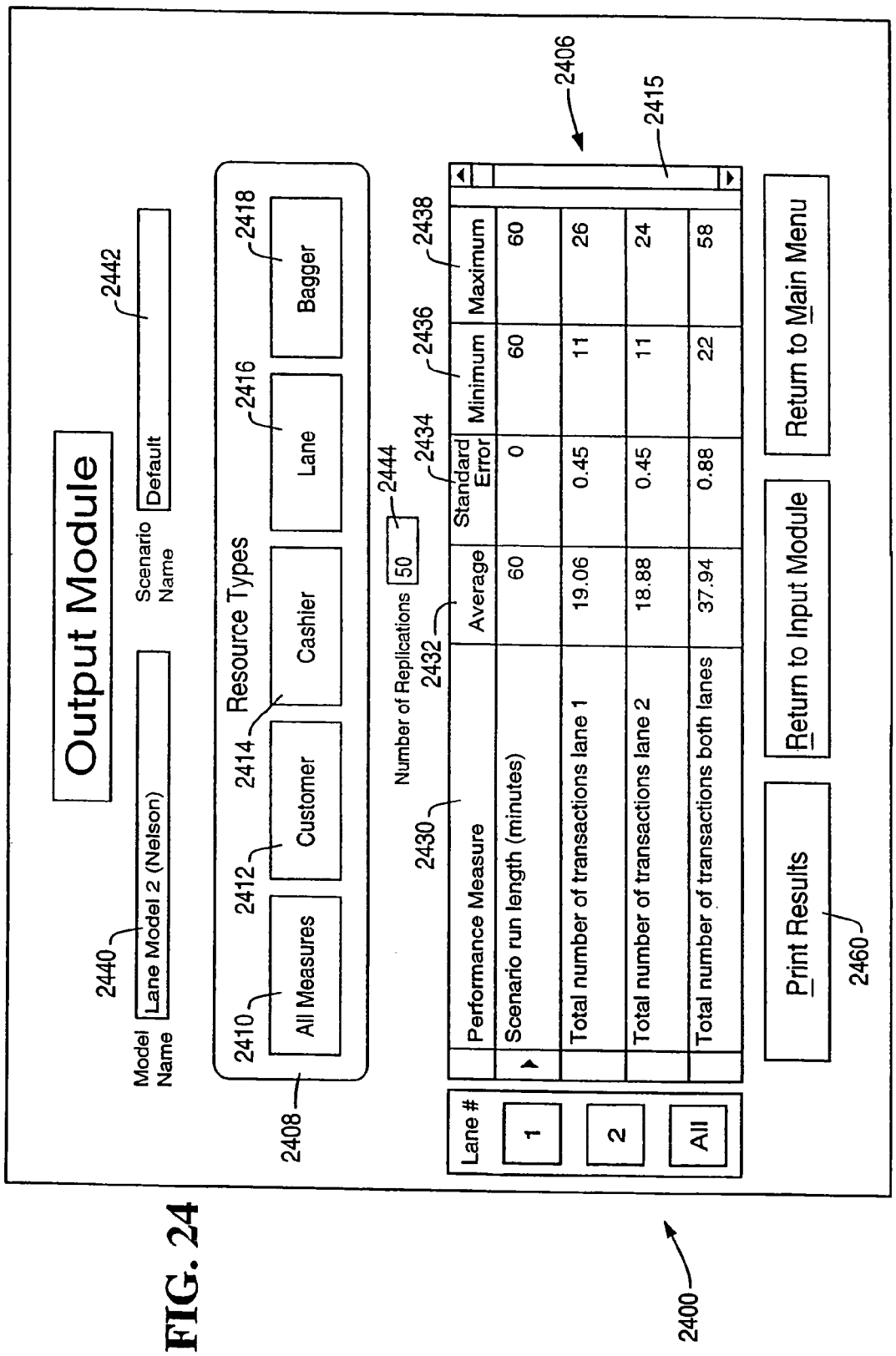
FIG. 24 depicts an output module for the Nelson lane 2 of scenario.

FIGS. 23 and 24 depict Output Module forms for the Front-End model 2300 and 2-Lane models 2400, respectively. The difference between the Output Module forms is each has a different set 2310, 2410 of Resource Type filter buttons. In FIG. 23, the set of buttons 2308 includes an all measures button 2310, a baggers button 2312, a Cashiers button 2314, a Regular Lanes button 2316, a Fast-Track Lanes button 2318, an Overall Front-End button 2320, a Super Helpers button 2322 and an Express Lanes button 2324, respectively. In FIG. 24, the set of buttons 2408 includes an All Measures button 2410, a Customer button 2412, a Cashier button 2414, a Lane button 2416 and a Bagger button 2418, respectively. These buttons allow the User to display only the performance measure associated with a particular resource, e.g., number of regular lane transactions. Also the Output Module form for the 2-Lane models allows the user to view the performance measures by Lane #. To view the report, the User uses the scroll bar 2315, 2415 to the right of a Performance Measures table 2306, 2406. To view Performance Measures for a particular model resource, the User should click the resource button in the Resource Type section 2308, 2408.

The Output Module forms 2300, 2400 also display the Model Name box 2340, 2440, Scenario Name box 2342, 2442, and the number of replications (e.g., 50 in FIG. 24; see box 2344, 2444) that were used to generate the report. The number of replications indicates the number of times the scenario was repeated. The purpose of replicating a scenario is to obtain sufficient number of independent and identically distributed observations so one can estimate the performance measures, e.g., average number of transactions per hour for Lane 1 in FIG. 24, with enough precision to make valid inferences. In general, increasing the number of replications increases the precision (reduces the standard error) in estimating the average performance measure.

The performance measures report 2306, 2406 contains estimates for the average, standard error, minimum, and maximum value for each performance measure. Columns 2330, 2430 are for description of performance measure. Columns 2332, 2432 include averages. Columns 2334, 2434 include the standard error. Columns 2336, 2436 include a minimum value and columns 2338, 2438 include maximum values. The minimum and maximum values are the minimum and maximum values of the summarized performance measure at the end of a replication and not necessarily the minimum and maximum value during a replication. The standard error statistic provides a measure of error for how well the average value reported by the model estimates "the true" average value. In general, one can view "the true" average value to fall within plus or minus two times the standard error value around the estimated average.

An alternative way to view a performance measures report is to select a Print Results button 2360, 2460. This action creates a performance measures report document and displays it on the screen. FIGS. 25 and 26 illustrate the reports for the Front-end model and LaneM2, respectively. The User can use the control buttons at the top of this form to page through the report, print it, or save it to a disk file in various data formats.

The other two options for the output Module form are Return to Input Module and Return to Main Menu.

The LFEM does not save simulation results from previous simulation runs. so, the User will need to send the report to a printer or write it to a file to retain the results each time they run a scenario. Writing the report to a file and reading it into a spreadsheet application such as Excel™ or Lotus™ makes it easier to consolidate output reports comparing system performance across simulation scenario. It should now be apparent that a Lane and Front-End Effectiveness Model has been described. Advantageously, the LFEM module is a self-contained PC desktop application that allows an analyst to quantitatively predict the impact of changes to their checkout operations. The LFEM module contains four simulation models representing the complex interactions between customers, staff and checkstand resources. Three of these models are detailed lane models and the fourth is a store front-end checkout model. An analyst can use the LFEM to evaluate, in detail, different checkstand configurations, transaction processes, and the effect these have on overall front-end performance. The purpose of the present invention is to provide retailers with timely information to reduce the risk and uncertainties of investing in new technologies or design changes by predicting their impact and return before committing resources to their acquisition or implementation.

As depicted in FIG. 27, a logical architecture for the LFEM simulation model is illustrated. As depicted in FIG. 27, an import file 2705 is provided to an input module 2710. As depicted in FIG. 27, there is a scenario management section 2702, a running simulation section 2704 and an output management section 2706. The input module 2710 straddles both the scenario management section 2702 and the running simulation section 2704. The input module 2710 provides a model database 2715 with information from the imported file 2705. The input module 2710 also provides the various parameters to an application database 2720. The input module generates an input parameter's report 2725 which can be output to a printer 2780 or another disc file 2785. The input module provides information to the running simulation section 2704 and more particularly to an input file 2730. The input file 2730 is provided to an animation simulation model 2735 and to an analysis simulation model 2740. The models 2735, 2740 provide output to a check file 2745 and to an output file 2750. An output module receives the data from the input module 2710 and from the output file 2750. The output module 2755 provides data to a model database 2760 and to an FEM report 2765. The FEM report 2765 can be printed on printer 2780 or output to another disc file 2785.

There are two primary types of resources represented in the front-end simulation model.

Check Stands

The model represents four different types of check stands: self-service (i.e., SCOT E), assisted/self-service (i.e., SCOT C), express and regular. The user enters the number and types of lanes available for a scenario with the requirement that at least one lane is a regular lane. The maximum total number of lanes represented in a scenario is 48. Express, regular and SCOT C lanes in operator-assisted mode require a cashier (or an overflow resource to operate overflow or unscheduled open lanes) to process a transaction. The user may specify the period during which self-service lanes are available. An assisted/self-service lane is in operator-assisted mode when a cashier is scheduled to operate the lane, otherwise, it behaves the same way as a self-service lane.

Staff

The model represents five types of labor: cashiers, paystation cashiers, baggers, super-helpers and overflow resources. Cashiers are scheduled by type of lane (assisted/self-service, express and regular). Paystation cashiers are dedicated to handle intervention and check tender for self-service lanes only. If a paystation cashier is not represented, the model will assign these tasks to super-helpers. Baggers are assigned to a "bagger pool" and they are able to assist any lane that requests a bagger based on user input bagger rules. Super-helpers are also scheduled in a pool and are available for customer interventions or to bag on a first-come-first-serve basis depending upon the bagging rules specified by the user. The user can schedule the quantity of cashiers, paystation cashiers, baggers and super-helpers in 30-minute time intervals of a scenario.

The following six steps describe the basic customer flow represented in the simulation model:

1. A customer "arrives" at the front-end with a basket of items, a desired tender type to use and an inclination to use self-service or not.
2. A customer selects a lane to enter. First, they determine the set of available (open) lanes based on lane basket size and tender type restrictions and on whether they are willing to use self-service. Then they choose a lane from this available set that has the smallest total lane basket size. The lane basket size is the sum of all the items for each customer in the lane.
3. The customer enters the selected lane and may have to wait before they can receive service.
4. Once the lane's resources are available the transaction process begins.
5. The customer and the lane's resources work together to complete the transaction.
6. After the transaction is finished, the customer leaves the lane and departs the store.

The front-end simulation model represents the transaction process using the following events. The user can enter input parameters that govern these events by lane type.

Pre-itemization
   This occurs only if a customer enters an open lane that is idle (e.g., the cashier is waiting for a customer to arrive) or in self-service mode. The pre-itemization event represents the time to unload items per transaction at a check stand.

Itemization
   The itemization event represents the time for a cashier to enter items into the POS system. The user specifies these parameters in units of enter time per item.

Error
   The error event accounts for rare delays that occur primarily during the actual itemization. Examples of error tasks are items not on file, price checks/disputes, etc. The user can specify the probability that error events occur per transaction by lane type.

Miscellaneous
   The miscellaneous event accounts for delays that are not directly associated with the primary transaction tasks but occur in practice due to human nature. Examples of miscellaneous tasks are idle talking with cashier, dealing with kids, etc. The user can specify the probability that miscellaneous events occur per transaction by lane type.

Finalization
   The finalization event represents the tender time per transaction by tender type. Also included in the finalization process is a reward event.

Bagging
   The bagging event represents the time to bag a customer's items. This event will occur in parallel with the transaction after itemization begins, assuming a bagger, super-helper, or customer is available to bag. Otherwise, the bagging event will occur subsequent to the completion of the finalization (or intervention) event by the cashier.

An overview of the simulation process is illustrated in FIG. 28. At 2805, the model is started. At step 2810, the replication number is set at 1. At step 2815, the input file is read. At step 2820, the variables are initialized. At step 2825, the check file is written. At step 2830, the maximum arrival rate is found. At step 2835, the period counter-logic is started. At step 2840, the schedule change logic is started. At step 2845, the lane status scan logic is started. A step 2850, the create customer arrivals has begun. At step 2855 the scenario is simulated. At step 2860, the output file is written. At step 2865, it is determined if the last replication has been performed. If the answer is no, then at step 2870, the replication number is incremented by 1 and the process is returned to step 2830. If the last replication has been performed, then from step 2865, the process is ended at step 2875.

Referring now to FIG. 29, a customer flow process is depicted. At step 2905, the process has started. At step 2910, a non-homogeneous poisson arrival process is used to create customer arrivals. At step 2915, the basket size is generated. At step 2920, it is determined whether the basket size is 0. If the basket size is 0, then at step 2925, the basket size is set at 1. If the basket size is not 0, then from step 2920, it is determined whether the basket size is greater than 200 at step 2930. If the basket size is not greater than 200, then the process proceeds from step 2930 to step 2940. If the basket size is greater than 200, then the basket size is set at 200 at step 2935. From either step 2925 or step 2930, at step 2940, it is determined whether there is a continuous scan of front-end for an overflow lane. If the determination is no, then the process proceeds to step 3005. If the determination is positive, then at step 2940, then the process proceeds to step 2945 where the scan front and queue size is input.

Referring now to FIGS. 30–31 depicting flow diagrams describing a logic that is encoded in the model for a customer to select the lane. There are a number of lane types that the customer can choose from. As referred to herein SCOT is self-checkout lane. The first lane type is a SCOT E, check out, and express lane type. There is also a SCOT C which is self-check out convertible lane. The difference between a SCOT E and a SCOT C is that the SCOT E is strictly an express self-service check out and the SCOT C is a full length or full sized check stand that is convertible between a self-service mode and an operator mode. The third lane type that is represented is referred to as an express lane. The express lane has some restrictions, predominantly, basket size so that it can only be used if the transaction number is qualified for the basket size limit. The fourth type is a normal or regular lane which is a standard lane, no restrictions and a typical front. The SCOT C lane can be converted or potentially have two modes of operation, self-service or operator assist modes.

Five rectangles at the top of FIG. 30 indicate the four lane types, with one lane type comprising two separate options that are available in the model. The types of lanes available in the model include self-service ("SS"), regular ("Reg"), and express ("Exp"). The remaining lane type, the convertible self checkout type (SCOT) lane, may be configured as self service ("AS-SS") or as operator assist ("AS-OA") lanes.

The basic concept is the customer arrives to the front-end and the customer has a desired tender type and a number of items they are purchasing. Based on the status of the front-end, the customer goes through an algorithm to a particular lane to join and to receive service. The algorithm looks at the set of open lanes when the customer arrives at the front-end. From the set of open lanes the algorithm starts to identify the lanes that are candidate lanes to choose from base on the criteria. First, the customer's basket size qualifies for all the available lanes. The algorithm determines if there is a basket size requirement. The algorithm then determines whether the customer is willing to select or use a self-service lane. Some customers prefer to have a cashier checking them out. After the algorithm filters through those two basic logic checks, the algorithm then determines to choose the lane to go to the smallest amount of work in front of that customer. What is meant by the smallest amount of work in front of the customer, the algorithm looks at not just a queue at each open lane that are candidate lanes for the customer to choose from, but the algorithm looks at the total number of items for all customers ahead of this arriving customer and uses that as the surrogate for the amount of work. So the customer will select the lane with the least number of items for all customers ahead of them in that lane.

Referring now specifically to FIG. 30, at step 3005, there is a basket size limit restriction for self-service lanes and there is basket size limit restriction for express lanes which are attributed to the two different lane types. At step 3005, if the basket size limit for self-service lane is greater than the basket size limit for an express lane, then process proceeds to step 3010. If the basket size is less than the limit for an express lane, the process proceeds to step 3008. At step 3008, if the basket size is less than the basket size for an express lane then the process proceeds to step 3022. If the basket size is greater than the basket size for an express lane then from step 3008 the process proceeds to step 3012.

At step 3010, the algorithm determines if the current customer attributes for the current customer's basket size is greater than the basket size for the self-service lane. If the determination at step 3010 is positive, then at step 3012, it is determined if there are SCOT C series lanes available. If the answer is yes, meaning this ASCOT lane is unavailable, at step 3012, the process proceeds to step 3014. Then the customer can only select at step 3014 from the set of open regular lanes. The attribute of a customer is set at step 3014 such that the algorithm will only look through the number of lanes in the front-end that correspond to regular lanes. So that attribute is an attribute of a current customer. Setting that value of that attribute to check stand number of self-service check stands which is CSNUM, plus the number of ASCOT check stands which is the variable CSNUM AS plus the number of express check stands which is the variable CSNUM EXP plus 1 so that sets this attribute to the first regular check stand on the front-end configuration.

If the answer at step 3012 is no, then the process proceeds to step 3016. At step 3016, it is determined if there are ASCOT lanes or SCOT lanes available In operator assist mode for SCOT C lane it can be two types. They can be operating either on as an express lane or as a full service or regular lane. In an operator assist mode for SCOT C lane it can have a restriction just like an express lane would and the SCOT C lane would therefore be operating like a regular lane. At step 3016, it is determined, in an operator assist mode, the lane is operating like a regular lane or an express lane. If the answer is yes, at step 3016 the process proceeds to step 3018. At step 3018, the algorithm sets an attribute of the customer such that the set of available lanes to choose from now consists of regular lanes and all SCOT C lanes that are in operator assist mode and perform like regular lanes.

At step 3020, the algorithm determines if the basket size is less than or equal to the basket size limit for an express lane. If the answer is yes, at step 3020, then the process proceeds to step 3022 and determines the basket size less than or equal to the basket size limit for self-service. If the answer is yes from either step 3020 or step 3022, the process proceeds step 3026 where it is determined whether the customer is willing to use self-service. If the answer is yes at step 3026 then at step 3028 an attribute is set where the algorithm can consider all lane types.

If the answer at step 3028 is no, then the algorithm will only consider ASCOT operator assist, express and regular and the attributes are set at step 3030. If the answer at step 3020 is no, then the algorithm proceeds to step 2032 and it is determined if the self-service lanes are available. If the answer is yes at step 2032, then the algorithm proceeds to step 3014. If the answer at step 3032 is no, then it is determined whether the customer is willing to use self-service at step 3034. If the answer is no at step 3034 then the process proceeds to step 3012. If the answer is yes at step 3034, then the process proceeds to step 3036 and the attributes are set that he customer is willing to use self-service or regular. From step 3036, if the answer is yes, we consider SCOT, ASCOT self-service, ASCOT operator assist and regular and we set the attributes at step 3038. If the answer is no at step 3036, then at step 3040, SCOT, ASCOT self-service and regular are considered.

Following the steps depicted in FIG. 30, the sub-set of front-end lanes are identified that are candidate lanes to choose from based on the criteria. The algorithm has already determined the set of lanes the customer qualifies for based on the basket size restriction and based on the customer's willingness to use a self service lane, in self-service mode. So the algorithm has filtered out a sub-set of lanes. Now the algorithm decides which lane of the candidate lanes the customer will actually use and this is based on the idea of selecting the lane with the least amount of work ahead of you. Obviously, if an idle lane is available, the customer will want to select the idle lane. But if all the lanes have people in front of the customer, then the algorithm determines the lane with the least amount of items to be processed. That is what the logic of FIG. 31 illustrates.

At step 3105, a temporary variable is set equal to the attribute of the current customer KK. The temporary variable is the location the algorithm can check the status of the first available candidate lane. At step 3110, the counter variable JJ is set. JJ is another attribute of the current customer and just a flag in it. The purpose of JJ is to skip sub-set of lanes as necessary based on what is considered the candidate lanes. If JJ equals 0, the process proceeds to step 3112. If lane KK is available at step 3112, if lane KK is available and staffed, the process proceeds to step 3114. At step 3114, the algorithm checks to see if the total basket size for this particular lane is equal to 0. In other words the process is checking if the lane is available and idle. If step 3114 is yes, then the algorithm assigns this M2 at step 3116. Then choose the M2 (empty) lane to go to and it would then update the total basket size for the lane in which this customer is going to select at step 3118. At step 3120 the customer enters the lane and begins processing the transaction. At step 3122, the process is complete. If the answer at step 3110 is no, at step 3124, it is determined if JJ is 99 at step 3124.

At step 3124, if JJ equals 99, then at step 3126 it is determined if KK is express. If the answer at step 3126 is yes, then at step 3128, the lane attributes are set to a regular lane. If the answer at step 3126 is no, then the process proceeds to step 3112 and also from step 3128. From step 3124, if the answer is no, then it is determined whether at step 3130 whether the lane attributes should be ASCOT or express. If the determination of step 3130 is positive then the process proceeds to step 3132 where it is determined whether KK equals OA. If the answer at step 3132 is positive, then the process proceeds back to step 3128. If the answer at step 3130 is no, then the process proceeds to step 3112. If the answer at step 3132 is no, the process proceeds to step 3134 where it is determined whether KK is expressed. If the determination at step 3134 if yes, then the process proceeds to step 3128. If the determination at step 3134 is no, then the process proceeds to step 3112. From step 3112, if the answer is no, then it is determined at step 3140 whether M2 equals KK. If the determination at step 3140 is no, that is if M2 is unavailable, then the process proceeds to step 3142 where KK is incremented by 1. If the answer is yes at step 3140, then the process proceeds to step 3144 where M2 is incremented by 1. From step 3144, the process proceeds to step 3142. If the answer at step 3114 is no, then it is determined that step 3150 is the total basket size for lane KK is less than the total basket size for lane M2. If the determination at step 3150 is yes, then at step 3152, M2 is said equal to KK. If the determination of step 3150 is no, then at step 3150, the process proceeds to step 3142. From step 3142, it is determined whether KK is less than or equal to a CS number. If the determination at step 3154 is yes, then the process loops back to 3110. If the determination at step 3154 is negative, then the process proceeds to step 3118.

FIG. 32 displays an illustration of the basic task sequence and possible resources involved during the transaction process at cashier operated lanes (i.e., express, regular and assisted/self-service in operator assisted mode). The actual resources, tasks and task times involved in a transaction will depend on the input parameter values the user entered and resource availability at the point in time when service is requested. FIG. 32 also provides the definitions for queue time and transaction. The queue time is the duration of the time interval starting when a customer enters the lane and ending when the cashier enters the first item into the POS. The transaction time is the duration of the time interval between the start of the transaction and customer departure.

FIG. 33 displays an illustration of the basic task sequence and possible resources involved during the transaction process at cashier operated lanes (i.e., express, regular and assisted/self-service in operator assisted mode). The actual resources, tasks, and task times involved in a transaction will depend on the input parameter values the user entered and resource availability at the point in time when service is requested. FIG. 33 also provides the definitions for queue time and transaction. The queue time is the duration of the time interval starting when a customer enters the lane and ending when the cashier enters the first item into the POS. The transaction time is the duration of the time interval between the start of the transaction and customer departure.

The transaction process at self-service lanes has the customer performing the cashier tasks and all the bagging shown in FIG. 32. In addition, a paystation cashier would be the first to respond to an intervention or check tender request at self-service lanes. if the scenario did not represent paystation cashiers then supervisors (i.e., super-helpers) perform this function.

It will be readily seen by one of ordinary skill in the art that the present invention fulfills all of the objects set forth above. After reading the foregoing specification, one of ordinary skill will be able to affect various changes, substitutions of equivalents and various other aspects of the invention as broadly disclosed herein. It is therefore intended that the protection granted hereon be limited only by the definition contained in the appended claims and equivalents thereof.

What is claimed is:

1. A method of quantitatively evaluating alternatives to check-out operations using simulation model, comprising:
   selecting from a data input dictionary parameters describing a first check-out operations;
   inputting parameter values for the selected parameters describing the first check-out operations into the simulation model;

transforming the first check-out operation parameters into check-out performance results, wherein the transforming step is performed in either an unlimited arrival mode or a limited arrival mode; and outputting the results from the simulation model.

2. The method of claim 1, wherein the first check-out operations includes one of a transaction process at two front facing check stands, a transaction process at two back-to-back check stands and a transaction process at two front facing check stands for fast-track customers.

3. The method of claim 1, wherein the first check-out operations include check stand designs, transaction procedures and lane configurations.

4. The method of claim 1, wherein the simulation model simulates two lane models using check-out operations parameters describing the following events: pre-itemization, itemization, finalization, bagging and intervention.

5. The method of claim 1, wherein the first check-out operations represent front-end operations of a check-out process.

6. The method of claim 5, wherein the front-end operations has labor including cashiers, baggers, super-helpers and overflow resources.

7. The method of claim 1, wherein the first check-out operations parameters comprise a configuration category, a customer demand category, a schedule category, a transaction category, a transaction itemization category, a transaction finalization category, a transaction bagging category, a transaction intervention category, and a model parameters category.

8. The method of claim 7, wherein the configuration category includes parameters defining the length of and resources in a scenario.

9. The method of claim 8, wherein the resources include a number and type of check-stands and belt size.

10. The method of claim 7, wherein the customer demand category has parameters that control the workload on a front-end or lane.

11. The method of claim 10, wherein the parameters that control the workload include a number of customer arrivals and customer basket sizes.

12. The method of claim 7, wherein the schedules category includes schedules for cashier, bagger and super-helper in 30 minute intervals during a scenario.

13. The method of claim 7, wherein the transaction itemization parameters are scalar values.

14. The method of claim 13, wherein the scalar parameters are a mean and a standard event time distribution of an event time distribution.

15. The method of claim 7, wherein the transaction bagging category includes parameters which govern how long it takes to bag items and which resources are available for bagging.

16. The method of claim 7, wherein the model parameters include a number of replications, a stream number identifier and check input option identifier.

17. The method of claim 1, wherein the data input dictionary comprises at least one predetermined range of parameter values, and wherein the inputting step comprises inputting a parameter value within the predetermined range.

18. The method of claim 1, comprising one of outputting a report and displaying an animation of the results of the simulation.

19. The method of claim 1, further comprising:

selecting from a data input dictionary parameters describing a second check-out operations;

inputting parameter values for the selected parameters describing the second check-out operations into the simulation model;

transforming the second check-out operations parameters into alternative check-out performance results; and outputting the alternative results from the simulation model.

20. The method of claim 1, wherein the first check-out operations comprise a plurality of resource types, and wherein the results of said outputting step includes performance measures for each type of resource.

21. The method of claim 20, wherein the first check-out operations comprise a front-end model and wherein the output results include one of: all said measures; baggers; cashiers; regular lanes; fast-track lanes; self-service lanes, self service convertible to cashier operated lanes, overall front-end; super-helpers; and express lanes.

22. The method of claim 20, wherein the first check-out operations comprise a two lane model and wherein the output results include one of: all said measures; customer; cashier; lane; and bagger.

23. The method of claim 20, wherein the performance measures include an average, standard error, a minimum and a maximum value for each performance measure.

24. A method of predicting, with a simulation model programmed to accept parameters within a predetermined range, performance characteristics of a prospective check-out system for use in planning and designing a check-out system comprising:

selecting a check-out configuration;

determining parameters within the predetermined range that describe the check-out configuration;

inputting the parameters describing the checkout configuration into the simulation model;

determining parameters within the predetermined range that describe customer demand;

inputting the parameters describing the customer demand into the simulation model;

transforming the customer demand parameters and the check-out configuration parameters into checkout configuration performance, wherein the transforming step is performed in either an unlimited arrival mode or a limited arrival mode; and outputting information regarding the checkout configuration performance from the simulation model.

25. The method of claim 24, wherein the check-out configuration comprises a plurality of check stands, and wherein the step of determining parameters describing the checkout configuration comprises the step of:

determining for each of the plurality of check stands, at least one parameter that describes the check stand, and wherein the step of inputting the parameters describing the checkout configuration into the simulation model comprises the step of:

inputting the at least one parameter that describes the check stand for each of the plurality of check stands, and wherein the step of transforming comprises the step of:

transforming the customer demand parameters and the check-out configuration parameters into check stand performance for each of the plurality of check stands, and wherein the step of outputting information comprises the step of:

outputting information regarding the checkout configuration performance for each of the plurality of check stands, such that a comparison of the relative performance of each of the plurality of check stands is facilitated.

26. The method of claim 25, wherein each of the plurality of check stands comprises a check stand of a different type, and wherein the step of outputting information comprises the step of:
   outputting information regarding the checkout configuration performance for each type of the plurality of check stands, such that a comparison of the relative performance of each type of the plurality of check stands is facilitated.

27. The method of claim 24, wherein the check-out configuration comprises a plurality of labor types, and wherein the step of determining parameters describing the checkout configuration comprises the step of:
   determining for each of the plurality of labor types, at least one parameter that describes the labor type, and wherein the step of inputting the parameters describing the checkout configuration into the simulation model comprises the step of:
   inputting the at least one parameter that describes the labor type for each of the plurality of labor types, and wherein the step of transforming comprises the step of:
   transforming the customer demand parameters and the check-out configuration parameters into labor type performance for each of the plurality of labor types, and wherein the step of outputting information comprises the step of:
   outputting information regarding the checkout configuration performance for each of the plurality of labor types, such that a comparison of the relative performance of each of the plurality of labor types is facilitated.

28. The method of claim 27, wherein the plurality of labor types comprise cashiers, baggers and super-helpers, and wherein the step of outputting information comprises the step of:
   outputting information regarding the checkout configuration performance for cashiers, baggers and super-helpers, such that a comparison of the relative performance of the cashiers, baggers and super-helpers is facilitated.

29. A method of quantitatively evaluating alternatives to check-out operations using simulation model, comprising:
   selecting from a data input dictionary parameters describing a first check-out operations;
   wherein the first check-out operations includes one of a transaction process at two front facing check stands, a transaction process at two back-to-back check stands and a transaction process at two front facing check stands for fast-track customers;
   inputting parameter values for the selected parameters describing the first check-out operations into the simulation model;
   transforming the first check-out operation parameters into check-out performance results; and
   outputting the results from the simulation model.

30. A method of quantitatively evaluating alternatives to check-out operations using simulation model, comprising:
   selecting from a data input dictionary parameters describing a first check-out operations;
   wherein the first check-out operations include check stand designs, transaction procedures and lane configurations;
   inputting parameter values for the selected parameters describing the first check-out operations into the simulation model;
   transforming the first check-out operation parameters into check-out performance results; and
   outputting the results from the simulation model.

31. A method of quantitatively evaluating alternatives to check-out operations using simulation model, comprising:
   selecting from a data input dictionary parameters describing a first check-out operations;
   inputting parameter values for the selected parameters describing the first check-out operations into the simulation model;
   transforming the first check-out operation parameters into check-out performance results; and
   outputting the results from the simulation model;
   wherein the simulation model simulates two lane models using check-out operations parameters describing the following events: pre-itemization, itemization, finalization, bagging and intervention.

32. A method of quantitatively evaluating alternatives to check-out operations using simulation model, comprising:
   selecting from a data input dictionary parameters describing a first check-out operations;
   wherein the first check-out operations parameters comprise a configuration category, a customer demand category, a schedule category, a transaction category, a transaction itemization category, a transaction finalization category, a transaction bagging category, a transaction intervention category, and a model parameters category;
   inputting parameter values for the selected parameters describing the first check-out operations into the simulation model;
   transforming the first check-out operation parameters into check-out performance results; and
   outputting the results from the simulation model.

* * * * *